United States Patent
Yokoi

(10) Patent No.: US 9,759,898 B2
(45) Date of Patent: Sep. 12, 2017

(54) ZOOMING OPTICAL SYSTEM, OPTICAL APPARATUS AND METHOD FOR MANUFACTURING ZOOMING OPTICAL SYSTEM

(71) Applicant: NIKON CORPORATION, Chiyoda-ku, Tokyo (JP)

(72) Inventor: Norikazu Yokoi, Yokohama (JP)

(73) Assignee: Nikon Corporation, Tokyo (JP)

( * ) Notice: Subject to any disclaimer, the term of this patent is extended or adjusted under 35 U.S.C. 154(b) by 263 days.

(21) Appl. No.: 14/501,297

(22) Filed: Sep. 30, 2014

(65) Prior Publication Data

US 2015/0055221 A1 Feb. 26, 2015

Related U.S. Application Data

(63) Continuation of application No. PCT/JP2013/058729, filed on Mar. 26, 2013.

(30) Foreign Application Priority Data

Mar. 30, 2012 (JP) .................................. 2012-080344

(51) Int. Cl.
*G02B 15/16* (2006.01)
*G02B 15/173* (2006.01)
(Continued)

(52) U.S. Cl.
CPC ........... *G02B 15/16* (2013.01); *G02B 13/009* (2013.01); *G02B 15/173* (2013.01); *G02B 27/646* (2013.01); *G03B 3/10* (2013.01)

(58) Field of Classification Search
CPC ........ G03B 3/10; G02B 15/16; G02B 13/009; G02B 15/173; G02B 27/646
(Continued)

(56) References Cited

U.S. PATENT DOCUMENTS 5,504,625 A  4/1996 Minefuji
5,781,348 A * 7/1998 Ohtake ................ G02B 15/173
                                                      359/557
(Continued)

FOREIGN PATENT DOCUMENTS

CN   102073128 A   5/2011
JP    5-27172 A    2/1993
(Continued)

OTHER PUBLICATIONS

English translation of International Preliminary Report on Patentability from International Patent Application No. PCT/JP2013/058729, Oct. 9, 2014.
International Search Report from International Patent Application No. PCT/JP2013/058729, Jul. 9, 2013.

*Primary Examiner* — Ricky Mack
*Assistant Examiner* — Kristina Deherrera
(74) *Attorney, Agent, or Firm* — Shapiro, Gabor and Rosenberger, PLLC

(57) ABSTRACT

A zooming optical system includes, in order from an object side along an optical axis: a first lens group having positive refractive power; a second lens group having negative refractive power; a third lens group having positive refractive power; and a fourth lens group having positive refractive power; upon zooming from a wide-angle end state to a telephoto end state, a distance between the first lens group and the second lens group is varied, a distance between the second lens group and the third lens group is varied, and a distance between the third lens group and the fourth lens group is varied; the third lens group is composed of one positive lens; and a focus from an infinite-distance object up to a near-distance object is conducted by moving the third lens group in a direction of the optical axis.

31 Claims, 12 Drawing Sheets

(51) Int. Cl.
*G02B 13/00* (2006.01)
*G02B 27/64* (2006.01)
*G03B 3/10* (2006.01)

(58) Field of Classification Search
USPC .................................................. 359/557, 687
See application file for complete search history.

(56) References Cited

U.S. PATENT DOCUMENTS

| | | |
|---|---|---|
| 6,031,669 A | 2/2000 | Ohtake |
| 7,158,315 B2 * | 1/2007 | Shibayama .......... G02B 15/173 359/684 |
| 8,405,906 B2 | 3/2013 | Mizuguchi et al. |
| 2008/0212206 A1 | 9/2008 | Hatada |
| 2009/0086321 A1 | 4/2009 | Mizuguchi et al. |
| 2010/0091174 A1 | 4/2010 | Miyazaki et al. |

FOREIGN PATENT DOCUMENTS

| | | |
|---|---|---|
| JP | 5-45584 A | 2/1993 |
| JP | 7-318865 A | 12/1995 |
| JP | 8-101362 A | 4/1996 |
| JP | 8-122640 A | 5/1996 |
| JP | 11-344672 A | 12/1999 |
| JP | 2008-216440 A | 9/2008 |
| JP | 2009-086535 A | 4/2009 |
| JP | 2009-251118 A | 10/2009 |

* cited by examiner

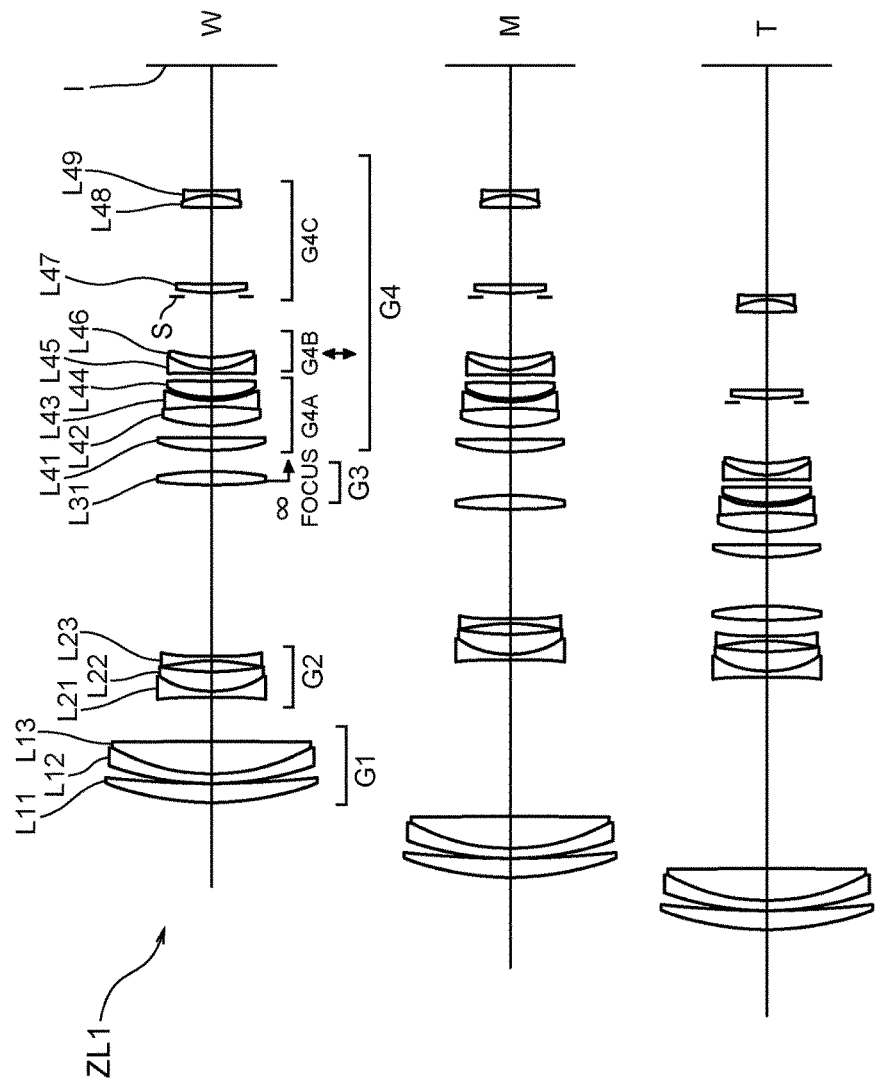

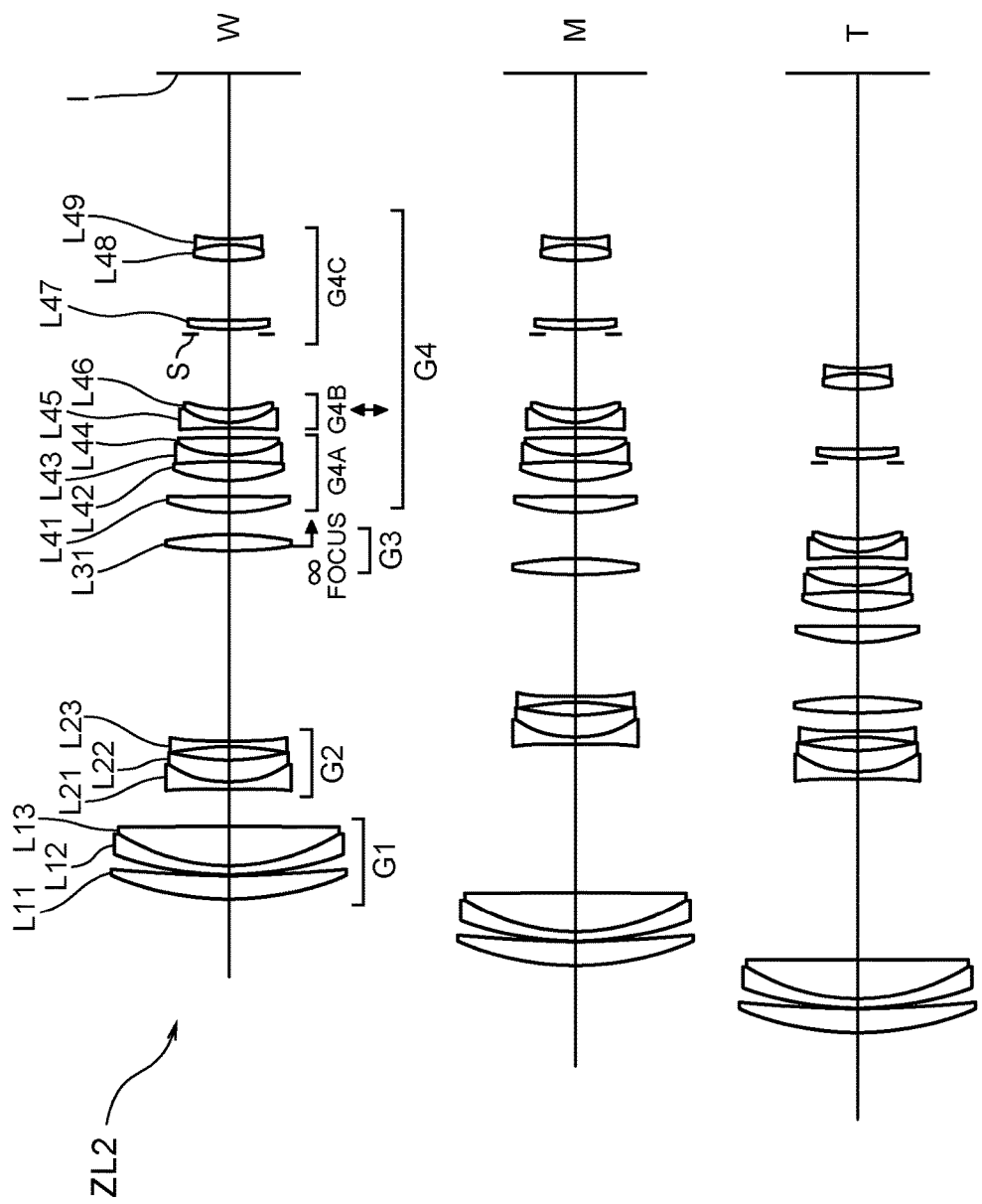

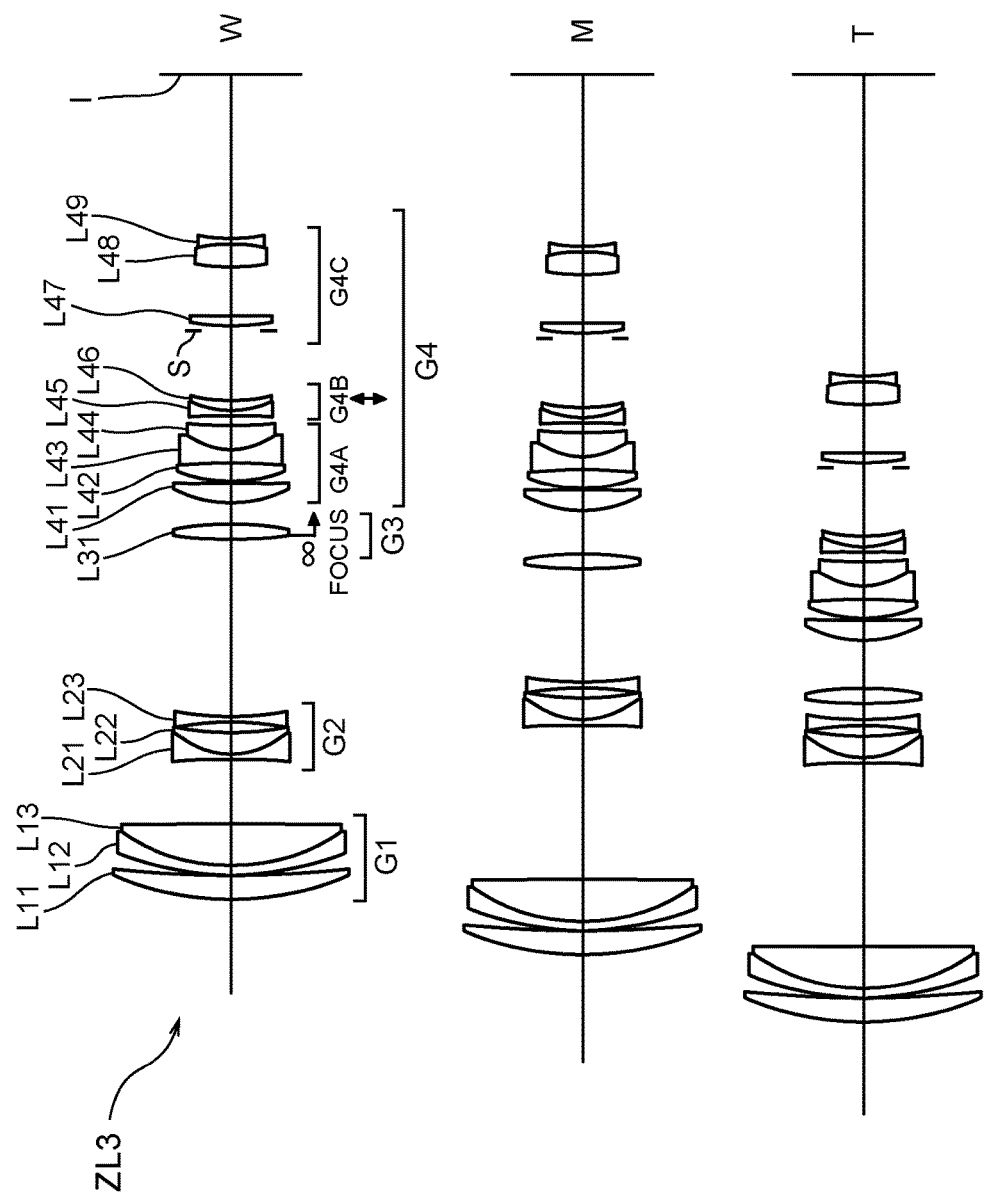

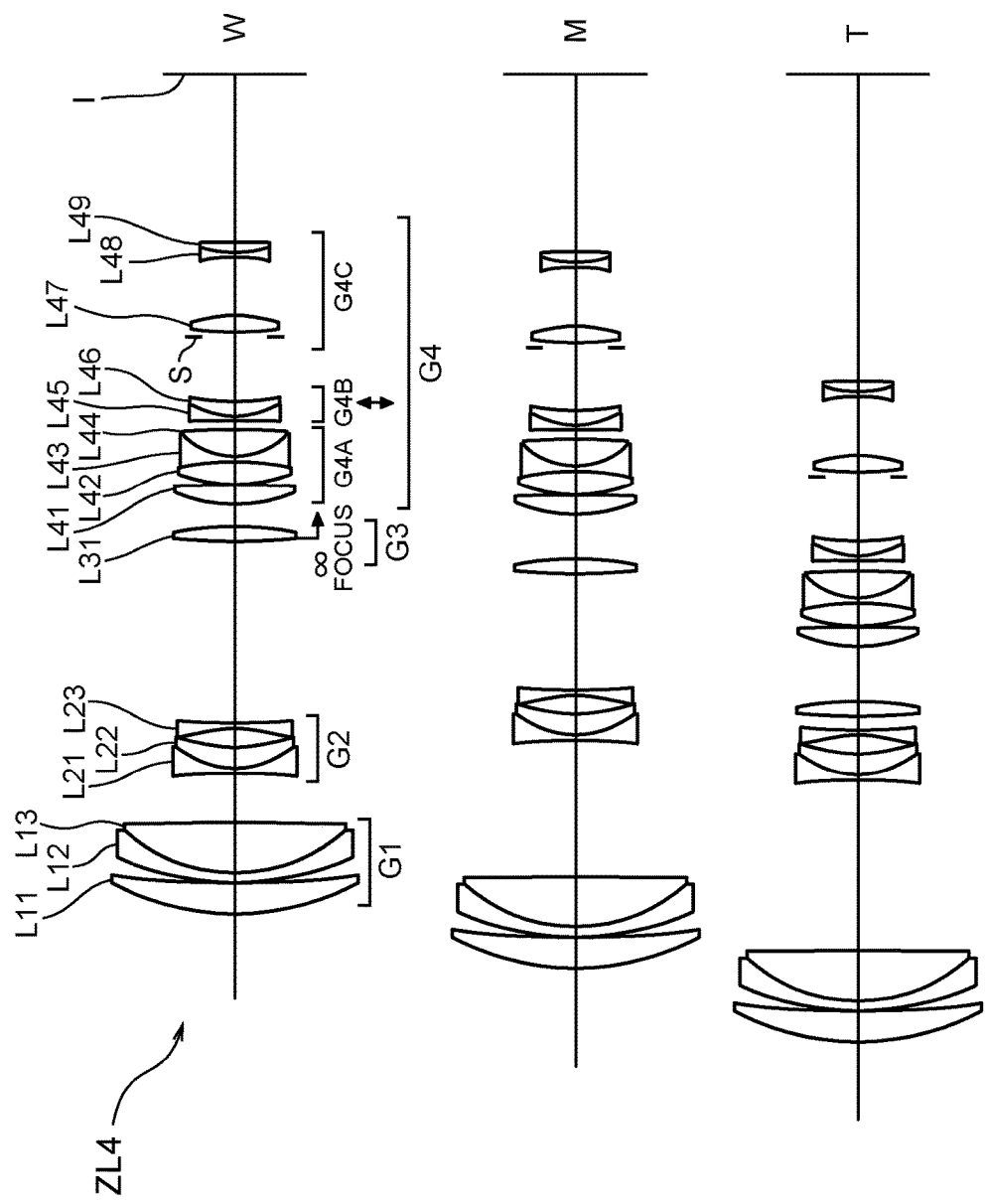

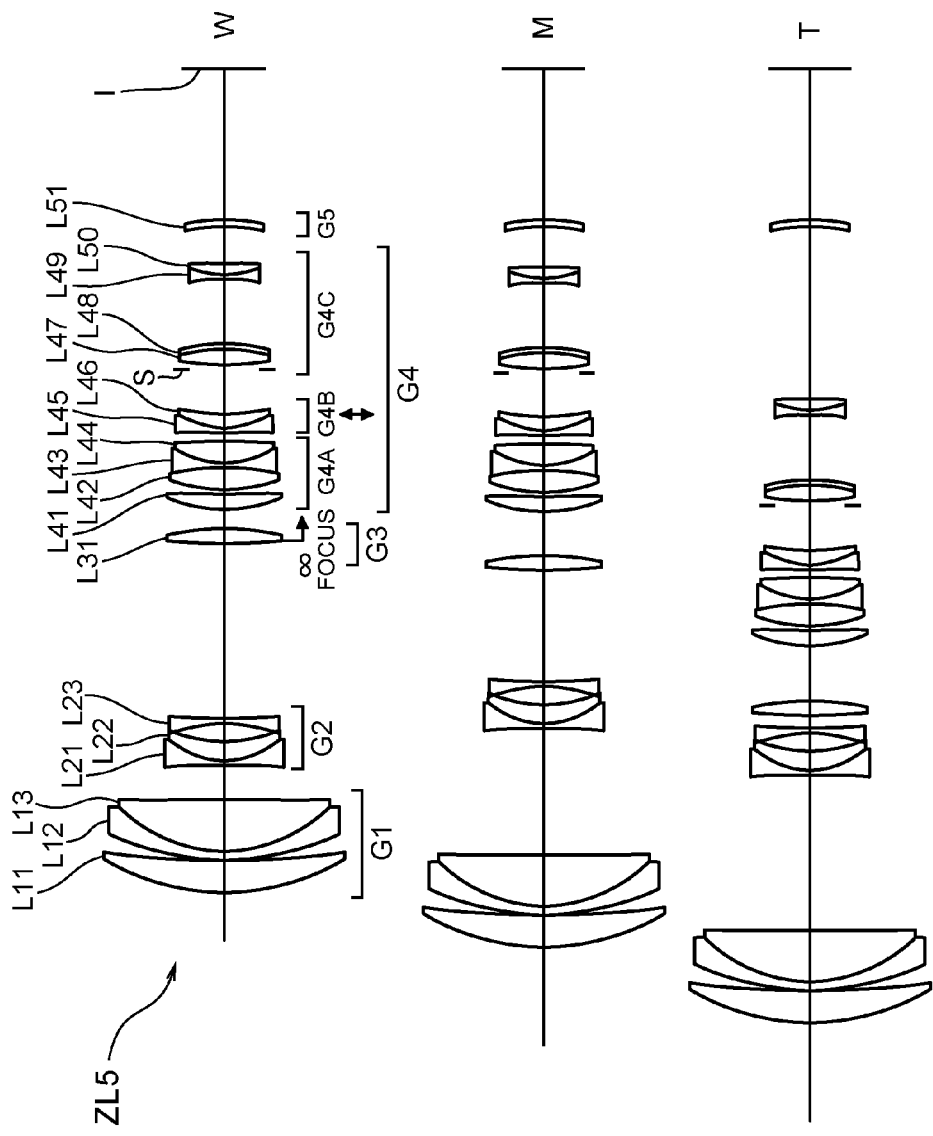

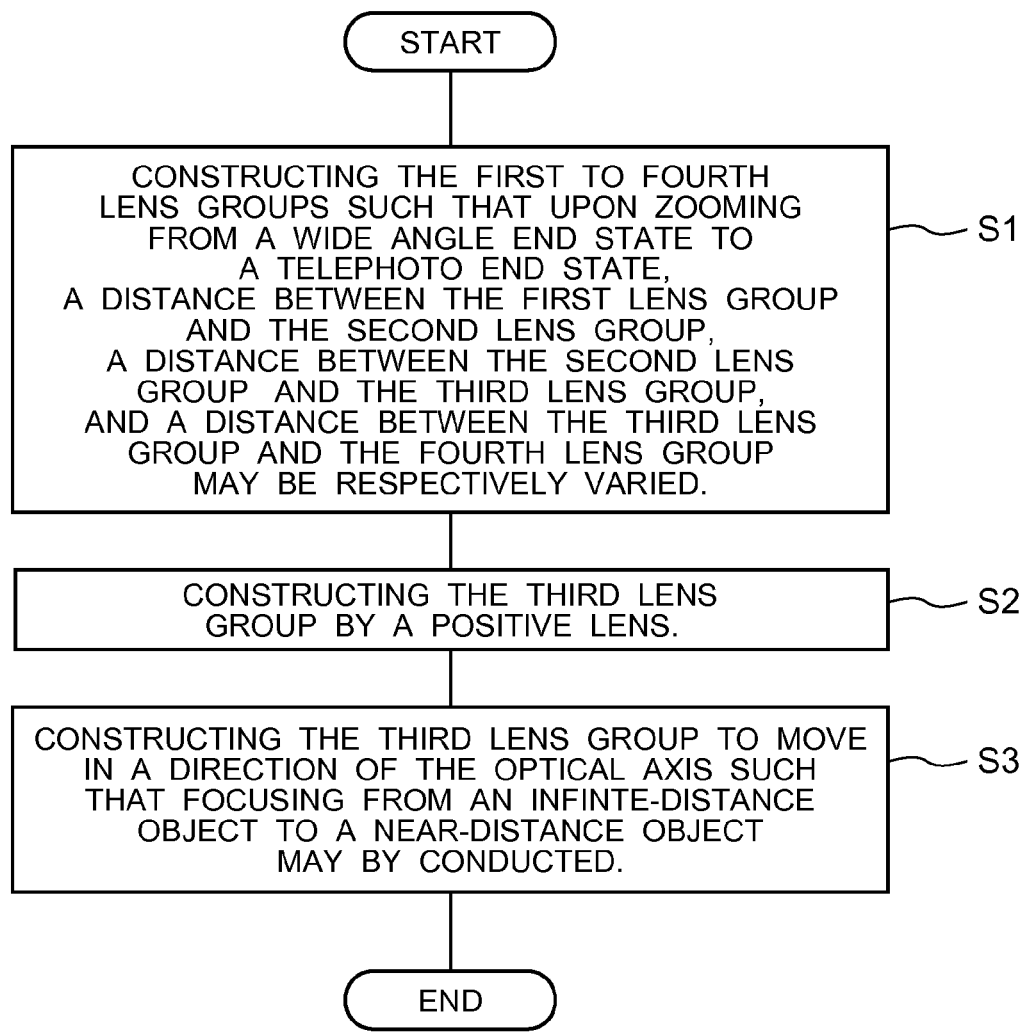

ZOOMING OPTICAL SYSTEM, OPTICAL APPARATUS AND METHOD FOR MANUFACTURING ZOOMING OPTICAL SYSTEM

TECHNICAL FIELD

The present invention relates to a zooming optical system suitable for an interchangeable lens for a camera, a digital camera and a video camera, an optical apparatus having this zooming optical system and a method for manufacturing the zooming optical system.

BACKGROUND ART

There has hitherto been proposed a zooming optical system used for an interchangeable lens for a lens interchangeable type camera and configured so that a lens group closest to an object side has positive refractive power as disclosed in Japanese Patent Application Laid-Open Publication No. 2009-86535.

PRIOR ART DOCUMENT

Patent Document

Japanese Patent Application Laid-Open Publication No. 2009-86535.

SUMMARY OF THE INVENTION

Problem to be Solved by the Invention

However, the conventional zooming optical system has been difficult to ensure sufficiently high optical performance while attaining downsizing and a speed-up of autofocusing.

The present invention is made in view of such circumstances, and has an object to provide a zooming optical system exhibiting sufficiently high optical performance while attaining downsizing and a speed-up of autofocusing, an optical apparatus having the zooming optical system and a method for manufacturing the zooming optical system.

Means for Solving the Problem

To accomplish the above object, according to the present invention, there is provided a zooming optical system including, in order from an object side along an optical axis: a first lens group having positive refractive power; a second lens group having negative refractive power; a third lens group having positive refractive power; and a fourth lens group having positive refractive power;

upon zooming from a wide-angle end state to a telephoto end state, a distance between the first lens group and the second lens group being varied, a distance between the second lens group and the third lens group being varied, and a distance between the third lens group and the fourth lens group being varied;

the third lens group being composed of one positive lens; and focusing from an infinite-distance object up to a near-distance object being conducted by moving the third lens group in a direction of the optical axis.

Further, an optical apparatus according to the present invention is characterized in the provision of the zooming optical system described above.

Still further, a method for manufacturing a zooming optical system according to the present invention includes, in order from an object side along an optical axis: a first lens group having positive refractive power; a second lens group having negative refractive power; a third lens group having positive refractive power; and a fourth lens group having positive refractive power;

the method including steps of, constructing the first to fourth lens groups such that upon zooming from a wide-angle end state to a telephoto end state, a distance between the first lens group and the second lens group, a distance between the second lens group and the third lens group, and a distance between the third lens group and the fourth lens group may be respectively varied, constructing the third lens group by a positive lens, constructing the third lens group to move in a direction of the optical axis such that focusing from an infinite-distance object to a near-distance object may be conducted.

Effect of the Invention

According to the present invention, it is feasible to provide the zooming optical system exhibiting the sufficiently high optical performance while attaining the downsizing and the speed-up of the autofocusing, the optical apparatus having the zooming optical system and the method for manufacturing the zooming optical system.

BRIEF DESCRIPTION OF THE DRAWINGS

FIG. 1 is a sectional view showing a lens layout of a zooming optical system according to a first Example of the present invention.

FIG. 2A illustrates a wide-angle end state; FIG. 2B illustrates an intermediate focal length state; and FIG. 2C illustrates a telephoto end state.

FIG. 3 is a sectional view showing a lens layout of a zooming optical system according to a second Example of the present invention.

FIG. 4A illustrates a wide-angle end state; FIG. 4B illustrates an intermediate focal length state; and FIG. 4C illustrates a telephoto end state.

FIG. 5 is a sectional view showing a lens layout of a zooming optical system according to a third Example of the present invention.

FIG. 6A illustrates a wide-angle end state; FIG. 6B illustrates an intermediate focal length state; and FIG. 6C illustrates a telephoto end state.

FIG. 7 is a sectional view showing a lens layout of a zooming optical system according to a fourth Example of the present invention.

FIG. 8A illustrates a wide-angle end state; FIG. 8B illustrates an intermediate focal length state; and FIG. 8C illustrates a telephoto end state.

FIG. 9 is a sectional view showing a lens layout of a zooming optical system according to a fifth Example of the present invention.

FIG. 10A illustrates a wide-angle end state; FIG. 10B illustrates an intermediate focal length state; and FIG. 10C illustrates a telephoto end state.

FIG. 12 is a flowchart showing an outline of a method for manufacturing the zooming optical system according to the present invention.

EMBODIMENT FOR CARRYING OUT THE INVENTION

Figure 2A:
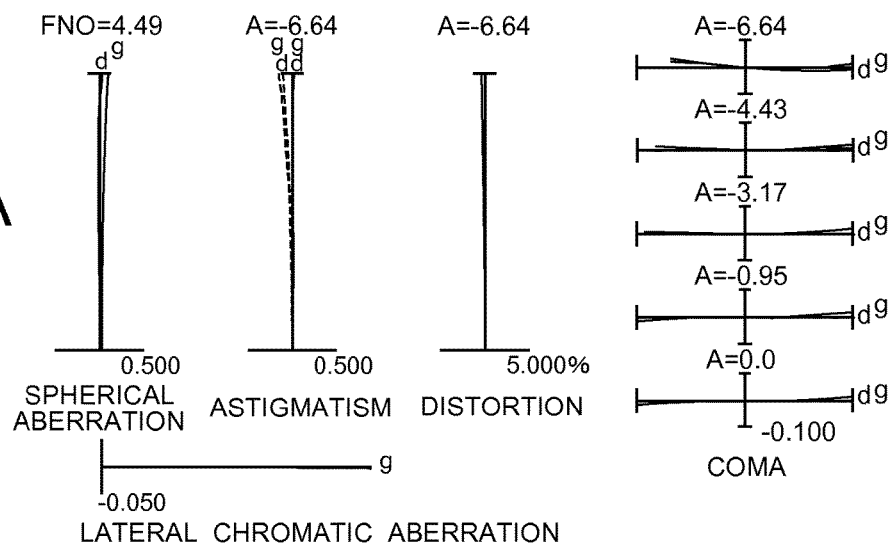
FIGS. 2A, 2B and 2C are, respectively, graphs showing various aberrations of the zooming optical system according to the first Example upon focusing on an infinite-distance object.

A zooming optical system, an optical apparatus and a method for manufacturing the zooming optical system according to the present invention will hereinafter be described.

The description will start with describing at first the zooming optical system according to the present invention. The zooming optical system according to the present invention includes, in order from an object side along an optical axis: a first lens group having positive refractive power; a second lens group having negative refractive power; a third lens group having positive refractive power; and a fourth lens group having positive refractive power;

upon zooming from a wide-angle end state to a telephoto end state, a distance between the first lens group and the second lens group, a distance between the second lens group and the third lens group and a distance between the third lens group and the fourth lens group are respectively varied; the third lens group is composed of one positive lens; and focusing from an infinite-distance object up to a near-distance object is conducted by moving the third lens group in a direction of the optical axis.

The zooming optical system according to the present invention includes, as described above, in order from the object side along the optical axis: the first lens group having positive refractive power; the second lens group having negative refractive power; the third lens group having positive refractive power; and the fourth lens group having positive refractive power; and, upon zooming from the wide-angle end state to the telephoto end state, the distance between the first lens group and the second lens group, the distance between the second lens group and the third lens group and the distance between the third lens group and the fourth lens group are respectively varied. This configuration enables a zoomable optical system to be realized and high optical performance to be attained by restraining a curvature of field from fluctuating, which entails zooming.

Further, in the zooming optical system according to the present invention, under this configuration, the third lens group is composed of one positive lens and is moved in the direction of the optical axis, thereby focusing from the infinite-distance object up to the near-distance object. With this configuration, a focusing lens decreases in weight, and the autofocus can be performed at a high speed even by use of a small-sized actuator. Still further, the zooming optical system can be downsized, whereby an outer diameter of a lens barrel can be reduced. As a result, the zooming optical system exhibiting a high optical performance can be realized while attaining the downsizing and the speed-up of the autofocusing.

Still further, in the zooming optical system according to the present invention, it is desirable that the positive lens of the third lens group takes a biconvex shape. With this configuration, the high optical performance can be attained by restraining a fluctuation in spherical aberration due to focusing.

Yet further, in the zooming optical system according to the present invention, it is desirable that the positive lens of the third lens group is configured to have a spherical lens surface. With this configuration, the much higher optical performance can be attained by restraining the fluctuation in spherical aberration due to the focusing.

Moreover, it is desirable that the zooming optical system according to the present invention satisfies the following conditional expression (1).

$$1.00 < R31A/(-R31B) < 3.00 \quad (1)$$

where R31A denotes a radius of curvature of an object-side surface of the positive lens of the third lens group, and R31B represents a radius of curvature of an image-side surface of the positive lens of the third lens group.

The conditional expression (1) defines a proper ratio of the radius of curvature of the object-side surface of the positive lens of the third lens group to the radius of curvature of the image-side surface of the positive lens of the third lens group. The conditional expression (1) being satisfied, the high optical performance can be attained by properly correcting a spherical aberration occurring by the positive lens of the third lens group.

When the value of R31A/(−R31B) of the conditional expression (1) is equal to or decreases below the lower limit value, it is difficult to correct a negative spherical aberration occurring by the positive lens of the third lens group. As a result, the high optical performance cannot be undesirably attained. Note that it is desirable that the lower limit value of the conditional expression (1) is set to 1.20 for ensuring effects of the present invention.

Whereas when the value of R31A/(−R31B) of the conditional expression (1) is equal to or exceeds the upper limit value, it is difficult to correct a positive spherical aberration occurring by the positive lens of the third lens group. As a result, the high optical performance cannot be undesirably attained. Note that it is desirable that the upper limit value of the conditional expression (1) is set to 2.50 for ensuring the effects of the present invention.

Furthermore, it is desirable that the zooming optical system according to the present invention satisfies the following conditional expression (2).

$$3.50 < ft/f3 < 5.00 \quad (2)$$

where ft denotes a focal length of the whole zooming optical system in the telephoto end state, and f3 is a focal length of the third lens group.

The conditional expression (2) defines a proper ratio of the focal length of the whole zooming optical system in the telephoto end state to the focal length of the third lens group. The conditional expression (2) being satisfied, the high optical performance can be attained by restraining a fluctuation in aberration upon focusing while working to achieve the downsizing.

When the value of the ft/f3 of the conditional expression (2) is equal to or decreases below the lower limit value, a moving quantity of the third lens group upon focusing increases. As a result, an overall length of the optical system elongates, resulting undesirably in difficulty to attain the downsizing. Note that the lower limit value of the conditional expression (2) is desirably set to 3.70 for ensuring the effects of the present invention.

Whereas when the value of the ft/f3 of the conditional expression (2) is equal to or exceeds the upper limit value, power of the third lens group intensifies or becomes strong, and the fluctuation in aberration upon focusing increases. As a result, the high optical performance cannot undesirably be attained. Note that the upper limit value of the conditional expression (2) is desirably set to 4.70 for ensuring the effects of the present invention.

Further, it is desirable that the zooming optical system according to the present invention satisfies the following conditional expression (3).

$$1.00<f1/fw<2.00 \qquad (3)$$

where f1 denotes a focal length of the first lens group, and fw is a focal length of the whole zooming optical system in the wide-angle end state.

The conditional expression (3) defines a proper range of the focal length of the first lens group. Note that "the refractive power being strong (intensifying) or weak (weakening)" connotes "an absolute value of the refractive power being large or small" in the following description.

When the value of the f1/fw of the conditional expression (3) is equal to or decreases below the lower limit value, the refractive power of the first lens group becomes strong, and it is difficult to correct a spherical aberration and an on-axis chromatic aberration. As a result, the high optical performance cannot undesirably be attained. Note that the lower limit value of the conditional expression (3) is desirably set to 1.20 for ensuring the effects of the present invention.

When the value of the f1/fw of the conditional expression (3) is equal to or exceeds the upper limit value, the refractive power of the first lens group weakens and overall length of the optical system elongates. As a result, the downsizing becomes undesirably hard to be accomplished. Moreover, it is difficult to correct an astigmatism. Consequently, the high optical performance cannot be undesirably attained. Note that the upper limit value of the conditional expression (3) is set desirably to 1.80 for ensuring the effects of the present invention.

Furthermore, it is desirable that the zooming optical system according to the present invention satisfies the following conditional expression (4).

$$0.300<(-f2)/fw<0.500 \qquad (4)$$

where f2 denotes a focal length of the second lens group, and fw is the focal length of the whole zooming optical system in the wide-angle end state.

The conditional expression (4) defines a proper range of the focal length of the second lens group.

When the value of the (−f2)/fw of the conditional expression (4) is equal to or decreases below the lower limit value, the negative refractive power of the second lens group becomes strong or intensifies, and it is difficult to correct the spherical aberration and a coma. As a result, the high optical performance cannot be undesirably attained. Note that the lower limit value of the conditional expression (4) is set desirably to 0.330 for ensuring the effects of the present invention.

When the value of the (−f2)/fw of the conditional expression (4) is equal to or exceeds the upper limit value, the negative refractive power of the second lens group weakens, and it is difficult to correct the astigmatism and the curvature of field. As a result, the high optical performance cannot be undesirably attained. It is to be noted that the upper limit value of the conditional expression (4) is set desirably to 0.470 for ensuring the effects of the present invention.

Further, in the zooming optical system according to the present invention, the fourth lens group includes, in order from the object side along the optical axis, a fourth A-lens group having positive refractive power, a fourth B-lens group having negative refractive power and a fourth C-lens group having positive refractive power, a configuration being desirably such that the fourth B-lens group is moved to have a component in a direction substantially orthogonal to the optical axis, thereby correcting an image blur caused by a camera shake, i.e., reducing vibrations. This configuration being thus taken, it is feasible to work to reduce the vibrations through the small-diameter lens groups, to decrease a camera shake correcting mechanism both in size and weight, and to downsize the lens barrel. It should be noted that an expression "moving to have a component in a direction substantially orthogonal to the optical axis" embraces "moving in a direction oblique to the optical axis" and "swaying about one point as a rotation center on the optical axis" in addition to "moving in a direction orthogonal to the optical axis".

Moreover, in the zooming optical system according to the present invention, it is desirable that the first lens group moves toward the object side with respect to an image plane along the optical axis when zooming to the telephoto end state from the wide-angle end state. With this configuration, the refractive power of the first lens group can be weakened, and a predetermined zooming ratio can be ensured by setting proper the refractive power of each lens group. If the refractive power of each lens group becomes excessively strong, it is difficult to correct the aberrations. Particularly if the refractive power of the second lens group becomes excessively strong, the curvature of field increases to undesirably cause the difficulty for the correction thereof. Furthermore, if the refractive power of the third lens group excessively intensifies, it is undesirably difficult to correct the aberrations upon focusing.

Furthermore, an optical apparatus according to the present invention includes the zooming optical system having the configuration described above. The optical apparatus exhibiting the high optical performance is thereby enabled to be realized.

Moreover, according to the present invention, a method for manufacturing a zooming optical system including, in order from an object side along an optical axis: a first lens group having positive refractive power; a second lens group having negative refractive power; a third lens group having the positive refractive power; and a fourth lens group having the positive refractive power;

the method including steps of, constructing the first to fourth lens groups such that upon zooming from a wide-angle end state to a telephoto end state, a distance between the first lens group and the second lens group, a distance between the second lens group and the third lens group, and a distance between the third lens group and the fourth lens group may be respectively varied, constructing the third lens group by a positive lens, constructing the third lens group to move in a direction of the optical axis such that focusing from an infinite-distance object to a near-distance object may be conducted.

Effect of the Invention

The zooming optical system exhibiting the high optical performance can be manufactured by such a method for manufacturing the zooming optical system.

NUMERICAL EXAMPLES

A zooming optical system according to each of Numerical Examples will hereinafter be described with reference to the accompanying drawings.

First Example

FIG. 1 is a sectional view showing a lens layout of a zooming optical system ZL1 according to a first Example of the present invention.

As illustrated in FIG. 1, the zooming optical system ZL1 according to the first Example is composed of, in order from an object side along an optical axis: a first lens group G1 having positive refractive power; a second lens group G2 having negative refractive power; a third lens group G3 having positive refractive power; and a fourth lens group G4 having positive refractive power.

In the zooming optical system ZL1 according to the first Example, upon zooming from a wide-angle end state W to a telephoto end state T, a distance between the first lens group G1 and the second lens group G2 increases, a distance between the second lens group G2 and the third lens group G3 decreases, and a distance between the third lens group G3 and the fourth lens group G4 increases. Further, with respect to an image plane I, the first lens group G1 moves toward the object side monotonously, the second lens group G2 moves in a convex shape on the side of the image plane I, and the third lens group G3 and the fourth lens group G4 move toward the object side monotonously. Focusing from an infinite-distance object up to a near-distance object is conducted by moving the third lens group G3 toward the image plane I.

The fourth lens group G4 is composed of, in order from the object side along the optical axis: a fourth A-lens group G4A having positive refractive power; a fourth B-lens group G4B having negative refractive power; and a fourth C-lens group G4C having positive refractive power. The fourth B-lens group G4B is moved to have a component in a direction substantially orthogonal to the optical axis, thereby correcting an image blur caused by a camera shake, i.e., reducing vibrations. An aperture stop S is disposed in an interior of the fourth lens group G4 and is configured to move integrally with the fourth lens group G4 upon zooming to the telephoto end from the wide-angle end.

The first lens group G1 is composed of, in order from the object side along the optical axis: a positive meniscus lens L11 with a convex surface directed to the object side; and a cemented lens of a negative meniscus lens L12 with a convex surface directed to the object side and a biconvex lens L13.

The second lens group G2 is composed of, in order from the object side along the optical axis: a cemented lens of a biconcave lens L21 and a positive meniscus lens L22 with a convex surface directed to the object side; and a biconcave lens L23.

The third lens group G3 is composed of a biconvex lens L31.

The fourth A-lens group G4A is composed of, in order from the object side along the optical axis: a positive meniscus lens L41 with a convex surface directed to the object side; a cemented lens of a biconvex lens L42 and a biconcave lens L43; and a biconvex lens L44.

The fourth B-lens group G4B is composed of, in order from the object side along the optical axis: a cemented lens of a biconcave lens L45 and a positive meniscus lens L46 with a convex surface directed to the object side.

The fourth C-lens group G4C is composed of, in order from the object side along the optical axis: a positive meniscus lens L47 with a convex surface directed to the object side; and a cemented lens of a biconvex lens L48 and a biconcave lens L49, in which a light flux emerging from the lens L49 forms an image on the image plane I.

The following Table 1 shows values of various items of data of the zooming optical system ZL1 according to the first Example of the present invention.

In [Whole Data] in the Table 1, the symbol f represents a focal length of the whole zooming optical system, FNO is an F-number, $2\omega$ is an angle of view (the unit is a degree), Y represents an image height, TL denotes an overall length of the lens extending from a surface closest to the object side in the first lens group G1 up to the image plane I. The symbol W represents a wide-angle end state, M denotes an intermediate focusing distance state, and T denotes a telephoto end state.

In [Surface Data], m represents a lens surface number counted from the object side, r stands for a radius of curvature of the lens surface, d denotes a distance from a lens surface to the next lens surface, nd represents a refractive index with respect to the d-line ($\lambda$=587.6 nm), and vd is an Abbe number with respect to the d-line ($\lambda$=587.6 nm). Further, the symbol op denotes an object surface, and I represents an image plane. Note that an expression "radius-of-curvature r=∞" implies a plane, and a description "an air refractive index d=1.00000" is omitted.

[Variable Distance data] shows values of a focal length f, the variable distance and an aperture stop diameter $\phi$.

[Lens Group Data] shows a starting surface number ST and a focal length f of each lens group.

[Values for Conditional Expressions] shows values of the respective conditional expressions.

Herein, the focal length f, the radius of curvature r and other lengths described in Table 1 involve using generally [mm] as the unit of the length. However, the optical system acquires the equal optical performance even when proportionally enlarged or reduced and is not therefore limited to this unit.

Note that the symbols in Table 1 shall be similarly applied to Tables of the respective Examples that will be described later on.

TABLE 1

First Example

[Whole Data]

|   | W | M | T |
|---|---|---|---|
| f | 72.00125 | 134.89858 | 291.55642 |
| FNO | 4.49 | 5.00 | 5.87 |
| 2ω | 13.27 | 7.04 | 3.26 |
| Y | 8.35 | 8.35 | 8.35 |
| TL | 174.82320 | 192.82728 | 205.27212 |

[Surface Data]

| m | r | d | nd | vd |
|---|---|---|---|---|
| op | ∞ | | | |
| 1) | 76.45460 | 4.70390 | 1.618000 | 63.34 |
| 2) | 256.81660 | 0.10000 | | |
| 3) | 83.48100 | 2.00000 | 1.795040 | 28.69 |
| 4) | 52.02470 | 7.82340 | 1.437000 | 95.00 |
| 5) | −2180.58150 | (D5) | | |
| 6) | −157.69770 | 1.10000 | 1.696800 | 55.52 |
| 7) | 24.58730 | 4.85060 | 1.846660 | 23.80 |
| 8) | 63.50810 | 2.55870 | | |

TABLE 1-continued

First Example

| | | | | |
|---|---|---|---|---|
| 9) | −56.90330 | 1.10000 | 1.772500 | 49.62 |
| 10) | 132.70460 | (D10) | | |
| 11) | 116.40050 | 3.30690 | 1.618000 | 63.34 |
| 12) | −74.88570 | (D12) | | |
| 13) | 46.27990 | 3.11080 | 1.593190 | 67.90 |
| 14) | 690.26650 | 2.83790 | | |
| 15) | 36.41800 | 4.52180 | 1.603000 | 65.44 |
| 16) | −121.73140 | 1.59630 | 1.950000 | 29.37 |
| 17) | 27.66160 | 0.72790 | | |
| 18) | 26.84000 | 3.88680 | 1.593190 | 67.90 |
| 19) | −1460.77280 | 2.00000 | | |
| 20) | −255.28680 | 0.90000 | 1.696800 | 55.52 |
| 21) | 20.15450 | 2.79110 | 1.902650 | 35.73 |
| 22) | 36.13630 | 14.30890 | | |
| 23) | ∞ | 1.00000 | Aperture Stop S | |
| 24) | 53.33500 | 2.00000 | 1.805180 | 25.45 |
| 25) | 14779.41800 | 18.48370 | | |
| 26) | 216.36190 | 2.89740 | 1.603420 | 38.03 |
| 27) | −18.15210 | 1.00000 | 1.834810 | 42.73 |
| 28) | 86.81180 | (BF) | | |
| I | ∞ | | | |

[Variable Distance Data]

| | W | M | T |
|---|---|---|---|
| f | 72.00125 | 134.89858 | 291.55642 |
| D5 | 10.53320 | 37.13510 | 45.64880 |
| D10 | 40.49600 | 25.95820 | 3.84220 |
| D12 | 4.75360 | 10.25890 | 11.38910 |
| BF | 29.43430 | 29.86898 | 54.78592 |
| φ | 14.60 | 13.20 | 17.40 |

[Lens Group Data]

| Group | ST | f |
|---|---|---|
| G1 | 1 | 116.15003 |
| G2 | 6 | −31.59403 |
| G3 | 11 | 74.22647 |
| G4 | 13 | 202.33188 |
| G4A | 13 | 65.90638 |
| G4B | 20 | −57.99956 |
| G4C | 23 | 471.52911 |

[Values for Conditional Expressions]

R31A = 116.40050
R31B = −74.88570
ft = 291.55642
fw = 72.00125
f1 = 116.15003
f2 = −31.59403
f3 = 74.22647
(1) R31A/(−R31B) = 1.554
(2) ft/f3 = 3.928
(3) f1/fw = 1.613
(4) (−f2)/fw = 0.4388

Figure 2B:
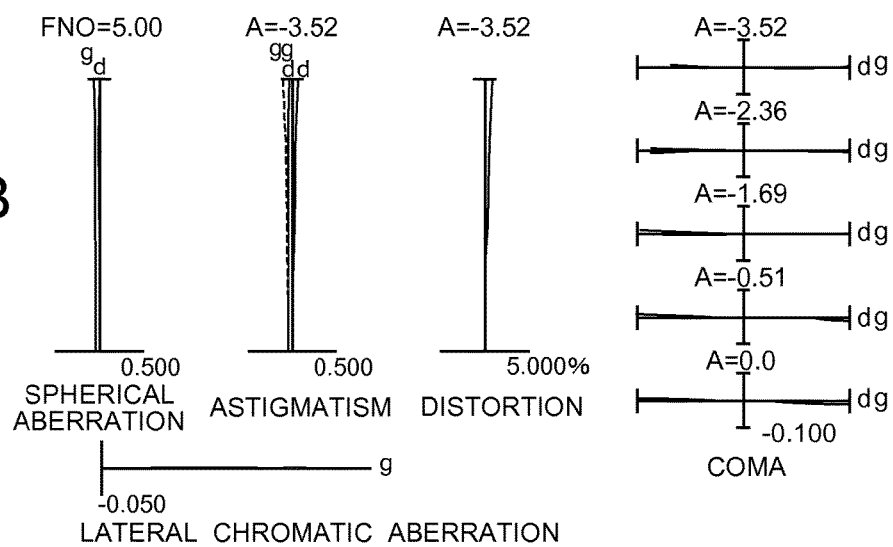
Figure 2C:
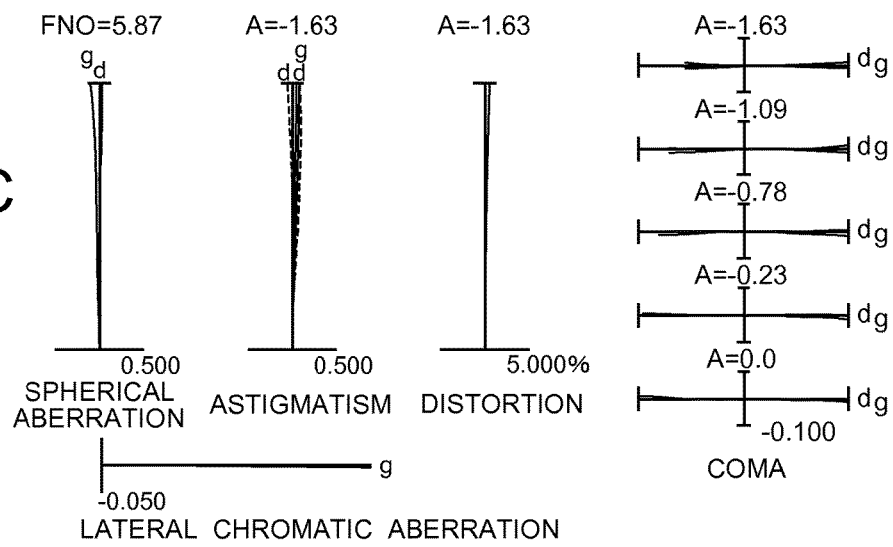

FIGS. 2A, 2B and 2C are diagrams of various aberrations upon focusing on the infinite-distance object of the zooming optical system ZL1 according to the first Example; FIG. 2A shows a wide-angle end state; FIG. 2B shows an intermediate focal length state; and FIG. 2C shows a telephoto end state.

In the individual aberration diagrams, FNO represents the F-number, and A denotes a half angle of view (unit: degree). Further, the symbol d represents an aberration curve in the d-line ($\lambda$=587.6 nm), g stands for an aberration curve in the g-line ($\lambda$=435.8 nm), and what is not marked with any marks represents an aberration curve in the d-line. In a diagram showing an astigmatism, a solid line indicates a saggital image plane, and a broken line indicates a meridional image plane. An aberration diagram of a coma shows meridional coma with respect to the d-line and the g-line at each half angle of view. Note that the same symbols as those in the first Example are applied to the various aberration diagrams in the respective Examples that will be given below.

As apparent from the respective aberration diagrams, it is understood that the zooming optical system ZL1 according to the first Example corrects well the various aberrations from the wide-angle end state to the telephoto end state throughout, and exhibits the high optical performance.

Second Example

FIG. 3 is a sectional view showing a lens layout of a zooming optical system ZL2 according to a second Example of the present invention.

As illustrated in FIG. 3, the zooming optical system ZL2 according to the second Example is composed of, in order from an object side along an optical axis: a first lens group G1 having positive refractive power; a second lens group G2 having negative refractive power; a third lens group G3 having positive refractive power; and a fourth lens group G4 having positive refractive power.

In the zooming optical system ZL2 according to the second Example, upon zooming from a wide-angle end state W to a telephoto end state T, a distance between the first lens group G1 and the second lens group G2 increases, a distance between the second lens group G2 and the third lens group G3 decreases, and a distance between the third lens group G3 and the fourth lens group G4 increases. Further, with respect to an image plane I, the first lens group G1 moves toward the object side monotonously, the second lens group G2 moves in a convex shape on the side of the image plane I, and the third lens group G3 and the fourth lens group G4 move toward the object side monotonously. Focusing from an infinite-distance object up to a near-distance object is conducted by moving the third lens group G3 toward the image plane I.

The fourth lens group G4 is composed of, in order from the object side along the optical axis: a fourth A-lens group G4A having positive refractive power; a fourth B-lens group G4B having negative refractive power; and a fourth C-lens group G4C having positive refractive power. The fourth B-lens group G4B is moved to have a component in a direction substantially orthogonal to the optical axis, thereby correcting an image blur caused by a camera shake, i.e., reducing vibrations. An aperture stop S is disposed in an interior of the fourth lens group G4 and is configured to move integrally with the fourth lens group G4 upon zooming to the telephoto end from the wide-angle end.

The first lens group G1 is composed of, in order from the object side along the optical axis: a positive meniscus lens L11 with a convex surface directed to the object side; and a cemented lens of a negative meniscus lens L12 with a convex surface directed to the object side and a biconvex lens L13.

The second lens group G2 is composed of, in order from the object side along the optical axis: a cemented lens of a biconcave lens L21 and a positive meniscus lens L22 with a convex surface directed to the object side; and a biconcave lens L23.

The third lens group G3 is composed of a biconvex lens L31.

The fourth A-lens group G4A is composed of, in order from the object side along the optical axis: a positive meniscus lens L41 with a convex surface directed to the object side; and a cemented lens of a biconvex lens L42, a biconcave lens L43 and a biconvex lens L44.

The fourth B-lens group G4B is composed of, in order from the object side along the optical axis: a cemented lens of a biconcave lens L45 and a positive meniscus lens L46 with a convex surface directed to the object side.

The fourth C-lens group G4C is composed of, in order from the object side along the optical axis: a positive meniscus lens L47 with a convex surface directed to the object side; and a cemented lens of a biconvex lens L48 and a biconcave lens L49, in which the light flux emerging from the lens L49 forms an image on the image plane I.

The following Table 2 shows values of various items of data of the zooming optical system ZL2 according to the second Example of the present invention.

TABLE 2

Second Example

[Whole Data]

| | W | M | T |
|---|---|---|---|
| f | 72.00407 | 134.90005 | 291.56827 |
| FNO | 4.55 | 5.34 | 5.87 |
| 2ω | 13.30 | 7.05 | 3.26 |
| Y | 8.35 | 8.35 | 8.35 |
| TL | 174.74594 | 189.28266 | 203.71361 |

[Surface Data]

| m | r | d | nd | vd |
|---|---|---|---|---|
| op | ∞ | | | |
| 1) | 70.10870 | 5.23050 | 1.618000 | 63.34 |
| 2) | 268.66420 | 0.12210 | | |
| 3) | 76.54770 | 2.00000 | 1.795040 | 28.69 |
| 4) | 47.28020 | 8.25010 | 1.437000 | 95.00 |
| 5) | −24087.04000 | (D5) | | |
| 6) | −183.21520 | 1.12770 | 1.696800 | 55.52 |
| 7) | 23.23900 | 5.01110 | 1.846660 | 23.80 |
| 8) | 57.06550 | 2.79090 | | |
| 9) | −52.66330 | 1.10000 | 1.772500 | 49.62 |
| 10) | 120.63120 | (D10) | | |
| 11) | 103.55650 | 3.40050 | 1.618000 | 63.34 |
| 12) | −74.96490 | (D12) | | |
| 13) | 44.07140 | 3.24670 | 1.593190 | 67.90 |
| 14) | 1062.48610 | 3.54580 | | |
| 15) | 34.82560 | 4.03550 | 1.603000 | 65.44 |
| 16) | −137.84300 | 1.28180 | 1.950000 | 29.37 |
| 17) | 27.29790 | 3.83840 | 1.593190 | 67.90 |
| 18) | −368.78740 | 2.00000 | | |
| 19) | −161.60230 | 1.10000 | 1.696800 | 55.52 |
| 20) | 18.28860 | 2.78580 | 1.902650 | 35.73 |
| 21) | 31.91770 | 16.09810 | | |
| 22) | ∞ | 1.00000 | Aperture Stop S | |
| 23) | 41.98930 | 2.00000 | 1.805180 | 25.45 |
| 24) | 148.51900 | 12.76000 | | |
| 25) | 38.57320 | 3.28950 | 1.603420 | 38.03 |
| 26) | −25.68470 | 1.00000 | 1.834810 | 42.73 |
| 27) | 37.72480 | (BF) | | |
| I | ∞ | | | |

[Variable Distance Data]

| | W | M | T |
|---|---|---|---|
| f | 72.00407 | 134.90005 | 291.56827 |
| D5 | 8.03140 | 31.60210 | 38.95920 |
| D10 | 40.23810 | 25.83910 | 3.62640 |
| D12 | 4.70750 | 9.88860 | 11.68210 |
| BF | 34.75444 | 34.93836 | 62.43141 |
| φ | 13.60 | 11.60 | 16.60 |

TABLE 2-continued

Second Example

[Lens Group Data]

| Group | ST | f |
|---|---|---|
| G1 | 1 | 105.61803 |
| G2 | 6 | −29.4996 |
| G3 | 11 | 70.88067 |
| G4 | 13 | 207.1073 |
| G4A | 13 | 58.25003 |
| G4B | 19 | −47.40352 |
| G4C | 22 | 296.63183 |

[Values for Conditional Expressions]

R31A = 103.55650
R31B = −74.96490
ft = 291.56827
fw = 72.00407
f1 = 105.61803
f2 = −29.4996
f3 = 70.88067
(1) R31A/(−R31B) = 1.381
(2) ft/f3 = 4.114
(3) f1/fw = 1.467
(4) (−f2)/fw = 0.4097

Figure 4A:
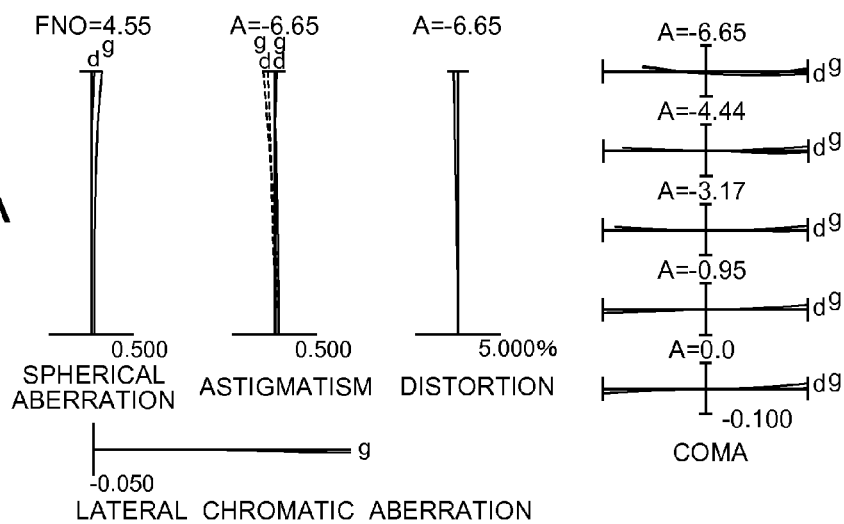
FIGS. 4A, 4B and 4C are, respectively, graphs showing various aberrations of the zooming optical system according to the second Example upon focusing on an infinite-distance object.
Figure 4B:
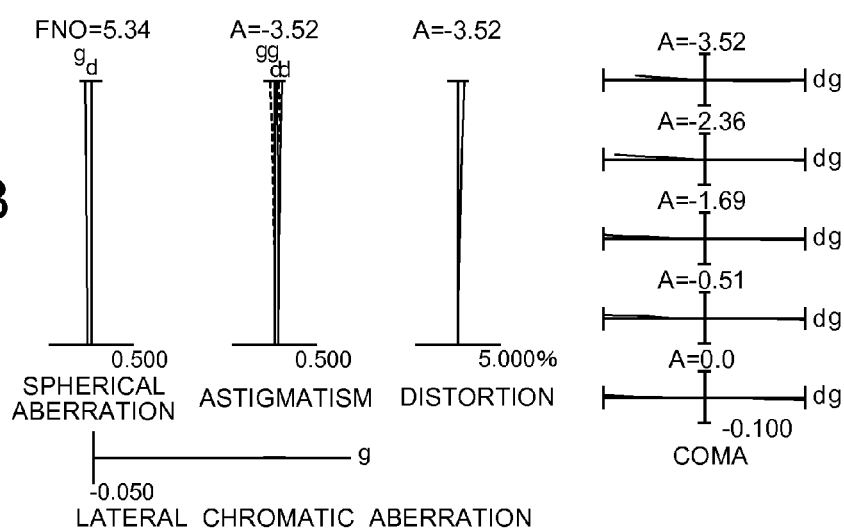
Figure 4C:
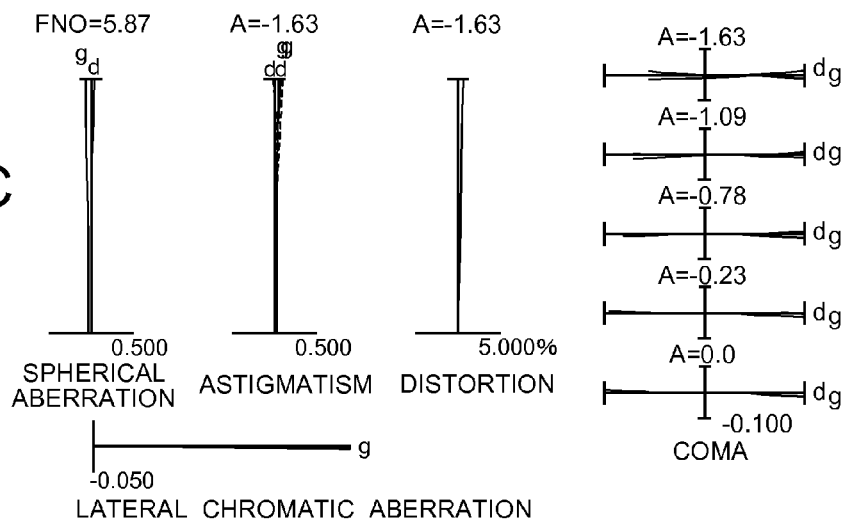

FIGS. 4A, 4B and 4C are diagrams of the various aberrations upon focusing on the infinite-distance object of the zooming optical system ZL2 according to the second Example; FIG. 4A shows the wide-angle end state; FIG. 4B shows the intermediate focal length state; and FIG. 4C shows the telephoto end state.

As apparent from the respective aberration diagrams, it is understood that the zooming optical system ZL2 according to the second Example corrects well the various aberrations from the wide-angle end state to the telephoto end state throughout, and exhibits the high optical performance.

Third Example

FIG. 5 is a sectional view showing a lens layout of a zooming optical system ZL3 according to a third Example of the present invention.

As illustrated in FIG. 5, the zooming optical system ZL3 according to the third Example is composed of, in order from an object side along an optical axis: a first lens group G1 having positive refractive power; a second lens group G2 having negative refractive power; a third lens group G3 having positive refractive power; and a fourth lens group G4 having positive refractive power.

In the zooming optical system ZL3 according to the third Example, upon zooming from a wide-angle end state W to a telephoto end state T, a distance between the first lens group G1 and the second lens group G2 increases, a distance between the second lens group G2 and the third lens group G3 decreases, and a distance between the third lens group G3 and the fourth lens group G4 increases. Further, with respect to an image plane I, the first lens group G1 moves toward the object side monotonously, the second lens group G2 moves in a convex shape on the side of the image plane I, and the third lens group G3 and the fourth lens group G4 move toward the object side monotonously. Focusing from an infinite-distance object up to a near-distance object is conducted by moving the third lens group G3 toward the image plane I.

The fourth lens group G4 is composed of, in order from the object side along the optical axis: a fourth A-lens group G4A having positive refractive power; a fourth B-lens group G4B having negative refractive power; and a fourth C-lens group G4C having positive refractive power. The fourth B-lens group G4B is moved to have a component in a direction substantially orthogonal to the optical axis, thereby correcting an image blur caused by a camera shake, i.e., reducing vibrations. An aperture stop S is disposed in an interior of the fourth lens group G4 and is configured to move integrally with the fourth lens group G4 upon zooming to the telephoto end from the wide-angle end.

The first lens group G1 is composed of, in order from the object side along the optical axis: a positive meniscus lens L11 with a convex surface directed to the object side; and a cemented lens of a negative meniscus lens L12 with a convex surface directed to the object side and a biconvex lens L13.

The second lens group G2 is composed of, in order from the object side along the optical axis: a cemented lens of a biconcave lens L21 and a positive meniscus lens L22 with a convex surface directed to the object side; and a biconcave lens L23.

The third lens group G3 is composed of a biconvex lens L31.

The fourth A-lens group G4A is composed of, in order from the object side along the optical axis: a positive meniscus lens L41 with a convex surface directed to the object side; and a cemented lens of a biconvex lens L42, a biconcave lens L43 and a positive meniscus lens L44 with a convex surface directed to the object side.

The fourth B-lens group G4B is composed of, in order from the object side along the optical axis: a cemented lens of a biconcave lens L45 and a positive meniscus lens L46 with a convex surface directed to the object side.

The fourth C-lens group G4C is composed of, in order from the object side along the optical axis: a biconvex lens L47; and a cemented lens of a biconvex lens L48 and a biconcave lens L49, in which the light flux emerging from the lens L49 forms an image on the image plane I.

The following Table 3 shows values of various items of data of the zooming optical system ZL3 according to the third Example of the present invention.

TABLE 3

Third Example

[Whole Data]

| | W | M | T |
|---|---|---|---|
| f | 72.00160 | 134.90047 | 291.52685 |
| FNO | 4.57 | 5.23 | 5.88 |
| 2ω | 13.32 | 7.04 | 3.26 |
| Y | 8.35 | 8.35 | 8.35 |
| TL | 175.31110 | 187.01799 | 201.23981 |

[Surface Data]

| m | r | d | nd | νd |
|---|---|---|---|---|
| op | ∞ | | | |
| 1) | 70.57290 | 4.93910 | 1.618000 | 63.34 |
| 2) | 242.25150 | 0.10000 | | |
| 3) | 68.52880 | 2.00000 | 1.795040 | 28.69 |
| 4) | 43.51940 | 8.96140 | 1.437000 | 95.00 |
| 5) | −923.91020 | (D5) | | |
| 6) | −119.38590 | 1.10000 | 1.772500 | 49.62 |
| 7) | 19.58400 | 4.52140 | 2.000690 | 25.46 |
| 8) | 57.05290 | 2.23580 | | |
| 9) | −62.25060 | 1.10000 | 1.816000 | 46.59 |
| 10) | 66.25170 | (D10) | | |
| 11) | 104.75140 | 3.25500 | 1.603000 | 65.44 |
| 12) | −65.16700 | (D12) | | |

TABLE 3-continued

Third Example

| 13) | 28.76740 | 4.34410 | 1.487490 | 70.31 |
|---|---|---|---|---|
| 14) | −817.13650 | 0.10000 | | |
| 15) | 30.79330 | 4.33220 | 1.603000 | 65.44 |
| 16) | −102.29120 | 2.74200 | 1.902650 | 35.73 |
| 17) | 17.49490 | 5.22550 | 1.487490 | 70.31 |
| 18) | 152.53090 | 2.00000 | | |
| 19) | −175.94560 | 0.90000 | 1.696800 | 55.52 |
| 20) | 19.08870 | 2.32080 | 1.902650 | 35.73 |
| 21) | 34.38970 | 14.77920 | | |
| 22) | ∞ | 1.00000 | Aperture Stop S | |
| 23) | 46.00240 | 2.25290 | 1.834000 | 37.18 |
| 24) | −262.68650 | 10.32110 | | |
| 25) | 35.86780 | 5.06690 | 1.603420 | 38.03 |
| 26) | −34.36720 | 1.00000 | 1.883000 | 40.66 |
| 27) | 31.82930 | (BF) | | |
| I | ∞ | | | |

[Variable Distance Data]

| | W | M | T |
|---|---|---|---|
| f | 72.00160 | 134.90047 | 291.52685 |
| D5 | 13.85170 | 32.83900 | 39.17860 |
| D10 | 37.69540 | 24.12950 | 3.55890 |
| D12 | 4.37180 | 9.08570 | 10.13310 |
| BF | 34.79480 | 36.36639 | 63.77181 |
| φ | 13.40 | 12.10 | 16.90 |

[Lens Group Data]

| Group | ST | f |
|---|---|---|
| G1 | 1 | 98.62711 |
| G2 | 6 | −26.12048 |
| G3 | 11 | 67.10744 |
| G4 | 13 | 161.32694 |
| G4A | 13 | 82.33786 |
| G4B | 19 | −51.98201 |
| G4C | 22 | 90.43851 |

[Values for Conditional Expressions]

R31A = 104.75140
R31B = −65.16700
ft = 291.52685
fw = 72.00160
f1 = 98.62711
f2 = −26.12048
f3 = 67.10744
(1) R31A/(−R31B) = 1.607
(2) ft/f3 = 4.344
(3) f1/fw = 1.370
(4) (−f2)/fw = 0.3628

Figure 6A:
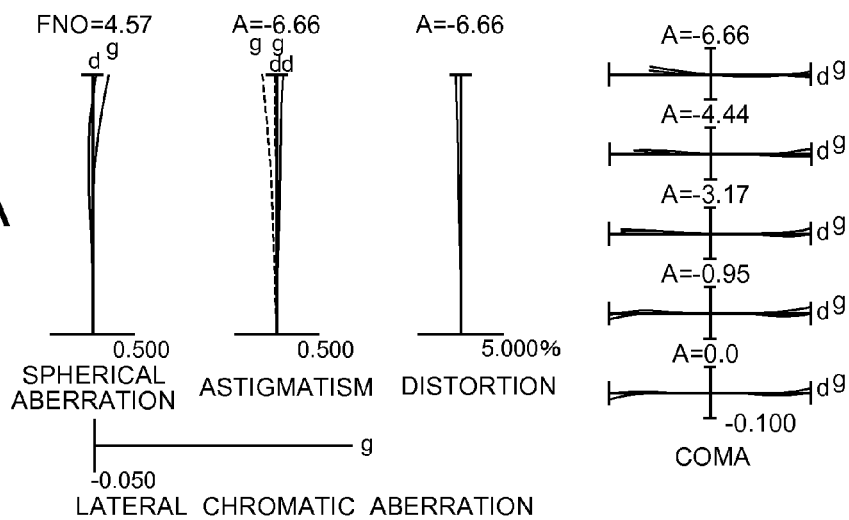
FIGS. 6A, 6B and 6C are, respectively, graphs showing various aberrations of the zooming optical system according to the third Example upon focusing on an infinite-distance object.
Figure 6B:
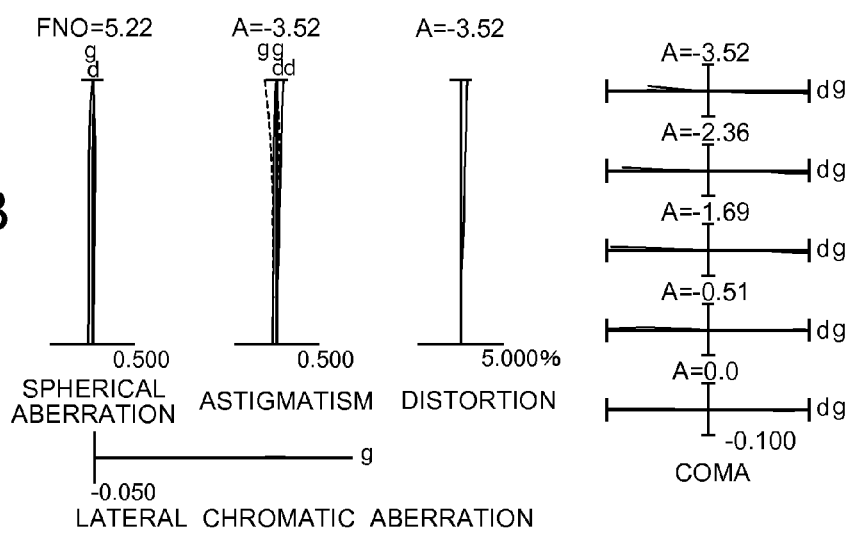
Figure 6C:
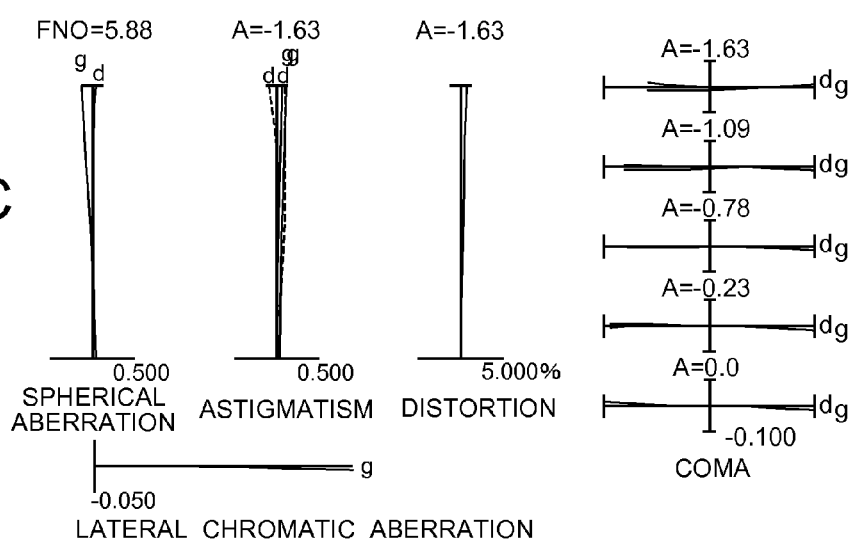

FIGS. 6A, 6B and 6C are diagrams of the various aberrations upon focusing on the infinite-distance object of the zooming optical system ZL3 according to the third Example; FIG. 6A shows the wide-angle end state; FIG. 6B shows the intermediate focal length state; and FIG. 6C shows the telephoto end state.

As apparent from the respective aberration diagrams, it is understood that the zooming optical system ZL3 according to the third Example corrects well the various aberrations from the wide-angle end state to the telephoto end state throughout, and exhibits the high optical performance.

Fourth Example

FIG. 7 is a sectional view showing a lens layout of a zooming optical system ZL4 according to a fourth Example of the present invention.

As illustrated in FIG. 7, the zooming optical system ZL4 according to the fourth Example is composed of, in order from an object side along an optical axis: a first lens group G1 having positive refractive power; a second lens group G2 having negative refractive power; a third lens group G3 having positive refractive power; and a fourth lens group G4 having positive refractive power.

In the zooming optical system ZL4 according to the fourth Example, upon zooming from a wide-angle end state W to a telephoto end state T, a distance between the first lens group G1 and the second lens group G2 increases, a distance between the second lens group G2 and the third lens group G3 decreases, and a distance between the third lens group G3 and the fourth lens group G4 increases. Further, with respect to an image plane I, the first lens group G1 moves toward the object side monotonously, the second lens group G2 moves in a convex shape on the side of the image plane I, and the third lens group G3 and the fourth lens group G4 move toward the object side monotonously. Focusing from an infinite-distance object up to a near-distance object is conducted by moving the third lens group G3 toward the image plane I.

The fourth lens group G4 is composed of, in order from the object side along the optical axis: a fourth A-lens group G4A having positive refractive power; a fourth B-lens group G4B having negative refractive power; and a fourth C-lens group G4C having positive refractive power. The fourth B-lens group G4B is moved to have a component in a direction substantially orthogonal to the optical axis, thereby correcting an image blur caused by a camera shake, i.e., reducing vibrations. An aperture stop S is disposed in an interior of the fourth lens group G4 and is configured to move integrally with the fourth lens group G4 upon zooming to the telephoto end from the wide-angle end.

The first lens group G1 is composed of, in order from the object side along the optical axis: a positive meniscus lens L11 with a convex surface directed to the object side; and a cemented lens of a negative meniscus lens L12 with a convex surface directed to the object side and a positive meniscus lens L13 with a convex surface directed to the object side.

The second lens group G2 is composed of, in order from the object side along the optical axis: a cemented lens of a biconcave lens L21 and a positive meniscus lens L22 with a convex surface directed to the object side; and a biconcave lens L23.

The third lens group G3 is composed of a biconvex lens L31.

The fourth A-lens group G4A is composed of, in order from the object side along the optical axis: a biconvex lens L41; and a cemented lens of a biconvex lens L42, a biconcave lens L43 and a biconvex lens L44.

The fourth B-lens group G4B is composed of, in order from the object side along the optical axis: a cemented lens of a biconcave lens L45 and a positive meniscus lens L46 with a convex surface directed to the object side.

The fourth C-lens group G4C is composed of, in order from the object side along the optical axis: a biconvex lens L47; and a cemented lens of a biconcave lens L48 and a biconvex lens L49, in which the light flux emerging from the lens L49 forms an image on the image plane I.

The following Table 4 shows values of various items of data of the zooming optical system ZL4 according to the fourth Example of the present invention.

TABLE 4

Fourth Example

[Whole Data]

| | W | M | T |
|---|---|---|---|
| f | 72.00198 | 134.90087 | 291.56400 |
| FNO | 4.53 | 5.17 | 5.89 |
| 2ω | 13.31 | 7.05 | 3.26 |
| Y | 8.35 | 8.35 | 8.35 |
| TL | 174.11210 | 185.42109 | 200.30283 |

[Surface Data]

| m | r | d | nd | νd |
|---|---|---|---|---|
| op | ∞ | | | |
| 1) | 54.92170 | 6.29800 | 1.603000 | 65.44 |
| 2) | 199.31210 | 0.10000 | | |
| 3) | 61.80160 | 2.00000 | 1.834000 | 37.18 |
| 4) | 34.33480 | 10.49620 | 1.437000 | 95.00 |
| 5) | 16937.45500 | (D5) | | |
| 6) | −156.57000 | 1.22310 | 1.618000 | 63.34 |
| 7) | 20.34000 | 4.24490 | 1.846660 | 23.80 |
| 8) | 33.04330 | 3.78250 | | |
| 9) | −36.70970 | 1.10000 | 1.593190 | 67.90 |
| 10) | 193.98970 | (D10) | | |
| 11) | 122.80240 | 3.24640 | 1.603000 | 65.44 |
| 12) | −60.94980 | (D12) | | |
| 13) | 32.71430 | 4.15430 | 1.487490 | 70.31 |
| 14) | −266.57680 | 0.10000 | | |
| 15) | 32.58110 | 4.70130 | 1.548140 | 45.51 |
| 16) | −62.05980 | 1.13330 | 1.902650 | 35.73 |
| 17) | 16.57230 | 5.51490 | 1.593190 | 67.90 |
| 18) | −229.10060 | 2.00000 | | |
| 19) | −186.61440 | 0.90000 | 1.772500 | 49.62 |
| 20) | 19.26900 | 2.92390 | 1.902650 | 35.73 |
| 21) | 44.24910 | 13.47910 | | |
| 22) | ∞ | 1.00000 | Aperture Stop S | |
| 23) | 78.39800 | 3.47240 | 1.517420 | 52.20 |
| 24) | −28.49740 | 12.23000 | | |
| 25) | −26.06210 | 1.00000 | 1.804000 | 46.60 |
| 26) | 27.95010 | 2.09780 | 1.688930 | 31.16 |
| 27) | −80.50700 | (BF) | | |
| I | ∞ | | | |

[Variable Distance Data]

| | W | M | T |
|---|---|---|---|
| f | 72.00198 | 134.90087 | 291.56400 |
| D5 | 10.32410 | 28.70590 | 35.09120 |
| D10 | 37.61910 | 23.80120 | 3.05980 |
| D12 | 4.45650 | 9.12770 | 11.45850 |
| BF | 34.51430 | 36.58819 | 63.49523 |
| φ | 14.20 | 12.90 | 17.70 |

[Lens Group Data]

| Group | ST | f |
|---|---|---|
| G1 | 1 | 98.28877 |
| G2 | 6 | −26.13187 |
| G3 | 11 | 68.00255 |
| G4 | 13 | 165.0289 |
| G4A | 13 | 70.31244 |
| G4B | 19 | −56.39926 |
| G4C | 22 | 157.08603 |

[Values for Conditional Expressions]

R31A = 122.80240
R31B = −60.94980
ft = 291.56400
fw = 72.00198
f1 = 98.28877
f2 = −26.13187
f3 = 68.00255

(1) R31A/(−R31B) = 2.015
(2) ft/f3 = 4.288

TABLE 4-continued

Fourth Example (3) f1/fw = 1.365
(4) (−f2)/fw = 0.3629

Figure 8A:
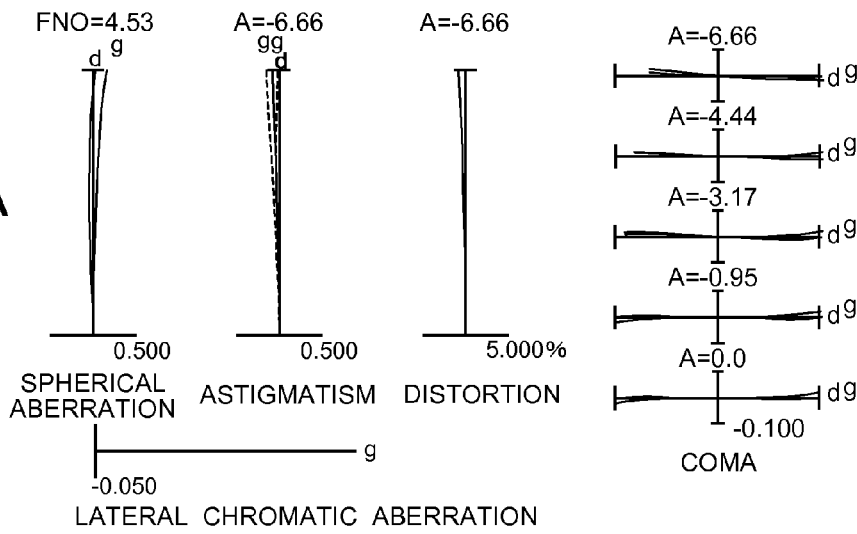
FIGS. 8A, 8B and 8C are, respectively, graphs showing various aberrations of the zooming optical system according to the fourth Example upon focusing on an infinite-distance object.
Figure 8B:
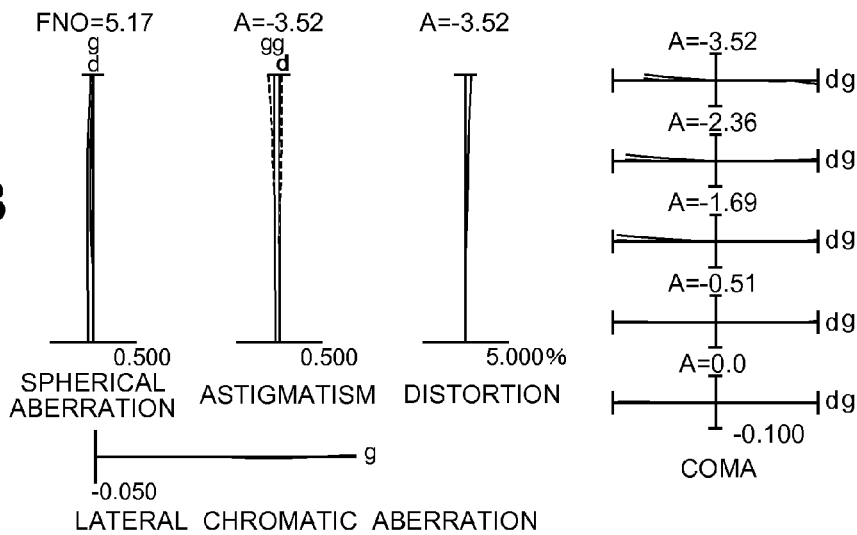
Figure 8C:
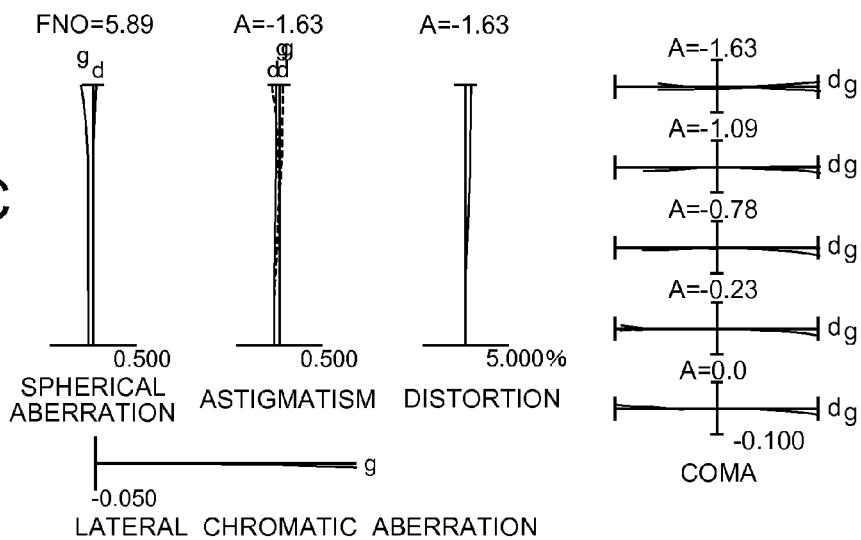

FIGS. 8A, 8B and 8C are diagrams of the various aberrations upon focusing on the infinite-distance object of the zooming optical system ZL4 according to the fourth Example; FIG. 8A shows the wide-angle end state; FIG. 8B shows the intermediate focal length state; and FIG. 8C shows the telephoto end state.

As apparent from the respective aberration diagrams, it is understood that the zooming optical system ZL4 according to the fourth Example corrects well the various aberrations from the wide-angle end state to the telephoto end state throughout, and exhibits the high optical performance.

Fifth Example

FIG. 9 is a sectional view showing a lens layout of a zooming optical system ZL5 according to a fifth Example of the present invention.

As illustrated in FIG. 9, the zooming optical system ZL5 according to the fifth Example is composed of, in order from an object side along an optical axis: a first lens group G1 having positive refractive power; a second lens group G2 having negative refractive power; a third lens group G3 having positive refractive power; a fourth lens group G4 having positive refractive power; and a fifth lens group G5 having the positive refractive power.

In the zooming optical system ZL5 according to the fifth Example, upon zooming from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 increases. Further, with respect to an image plane I, the first lens group G1 moves toward the object side monotonously, the second lens group G2 moves in a convex shape on the side of the image plane I, and the third lens group G3 and the fourth lens group G4 move toward the object side monotonously. Focusing from an infinite-distance object up to a near-distance object is conducted by moving the third lens group G3 toward the image plane I.

The fourth lens group G4 is composed of, in order from the object side along the optical axis: a fourth A-lens group G4A having positive refractive power; a fourth B-lens group G4B having negative refractive power; and a fourth C-lens group G4C having positive refractive power. The fourth B-lens group G4B is moved to have a component in a direction substantially orthogonal to the optical axis, thereby correcting an image blur caused by a camera shake, i.e., reducing vibrations. An aperture stop S is disposed in an interior of the fourth lens group G4 and is configured to move integrally with the fourth lens group G4 upon zooming to the telephoto end from the wide-angle end.

The first lens group G1 is composed of, in order from the object side along the optical axis: a positive meniscus lens L11 with a convex surface directed to the object side; and a cemented lens of a negative meniscus lens L12 with a convex surface directed to the object side and a positive meniscus lens L13 with a convex surface directed to the object side.

The second lens group G2 is composed of, in order from the object side along the optical axis: a cemented lens of a biconcave lens L21 and a positive meniscus lens L22 with a convex surface directed to the object side; and a biconcave lens L23.

The third lens group G3 is composed of a biconvex lens L31.

The fourth A-lens group G4A is composed of, in order from the object side along the optical axis: a positive meniscus lens L41 with a convex surface directed to the object side; and a cemented lens of a biconvex lens L42, a biconcave lens L43 and a biconvex lens L44.

The fourth B-lens group G4B is composed of, in order from the object side along the optical axis: a cemented lens of a biconcave lens L45 and a positive meniscus lens L46 with a convex surface directed to the object side.

The fourth C-lens group G4C is composed of, in order from the object side along the optical axis: a cemented lens of a biconvex lens L47 and a negative meniscus lens L48 with a concave surface directed to the object side; and a cemented lens of a biconcave lens L49 and a biconvex lens L50.

The fifth lens group G5 is composed of a positive meniscus lens L51 with a concave surface directed to the object side, in which the light flux emerging from the lens L51 forms an image on the image plane I.

The following Table 5 shows values of various items of data of the zooming optical system ZL5 according to the fifth Example of the present invention.

TABLE 5

Fifth Example

[Whole Data]

| | W | M | T |
|---|---|---|---|
| f | 72.00486 | 134.89841 | 291.54877 |
| FNO | 4.65 | 5.37 | 5.93 |
| 2ω | 13.31 | 7.05 | 3.26 |
| Y | 8.35 | 8.35 | 8.35 |
| TL | 174.91182 | 186.42192 | 202.55615 |

[Surface Data]

| m | r | d | nd | νd |
|---|---|---|---|---|
| op | ∞ | | | |
| 1) | 52.79430 | 6.72790 | 1.603000 | 65.44 |
| 2) | 192.26600 | 0.10000 | | |
| 3) | 59.81310 | 2.01620 | 1.834000 | 37.18 |
| 4) | 33.06570 | 10.93130 | 1.437000 | 95.00 |
| 5) | 1398.99180 | (D5) | | |
| 6) | −199.73510 | 1.10000 | 1.618000 | 63.34 |
| 7) | 20.10900 | 3.98210 | 1.846660 | 23.80 |
| 8) | 33.06570 | 3.80460 | | |
| 9) | −36.15720 | 1.10000 | 1.593190 | 67.90 |
| 10) | 153.39170 | (D10) | | |
| 11) | 129.41800 | 3.21260 | 1.603000 | 65.44 |
| 12) | −58.89280 | (D12) | | |
| 13) | 42.15740 | 3.02890 | 1.603000 | 65.44 |
| 14) | 1041.31140 | 0.86670 | | |
| 15) | 36.32190 | 4.54620 | 1.603000 | 65.44 |
| 16) | −55.98360 | 1.10000 | 1.902650 | 35.73 |
| 17) | 20.48130 | 4.50990 | 1.593190 | 67.90 |
| 18) | −647.99840 | 2.00000 | | |
| 19) | −222.13510 | 0.90000 | 1.772500 | 49.62 |
| 20) | 19.09330 | 2.96230 | 1.902650 | 35.73 |
| 21) | 43.40010 | 9.50520 | | |
| 22) | ∞ | 1.00000 | Aperture Stop S | |
| 23) | 60.56320 | 3.49120 | 1.603420 | 38.03 |
| 24) | −35.89700 | 1.00000 | 1.784720 | 25.64 |
| 25) | −41.35010 | 13.67130 | | |

TABLE 5-continued

Fifth Example

| 26) | −45.55270 | 1.00000 | 1.816000 | 46.59 |
|---|---|---|---|---|
| 27) | 20.47370 | 2.42650 | 1.620040 | 36.40 |
| 28) | −139.46190 | (D28) | | |
| 29) | −42.10500 | 1.50000 | 1.516800 | 63.88 |
| 30) | −37.71970 | (BF) | | |
| I | ∞ | | | |

[Variable Distance Data]

| | W | M | T |
|---|---|---|---|
| f | 72.00486 | 134.89841 | 291.54877 |
| D5 | 7.38130 | 26.87990 | 33.29350 |
| D10 | 36.98130 | 23.42730 | 2.50000 |
| D12 | 4.30580 | 9.20650 | 11.70530 |
| D28 | 7.73030 | 8.39550 | 36.54580 |
| BF | 32.02982 | 32.02982 | 32.02865 |
| φ | 15.60 | 13.60 | 18.60 |

[Lens Group Data]

| Group | ST | f |
|---|---|---|
| G1 | 1 | 97.08614 |
| G2 | 6 | −26.14657 |
| G3 | 11 | 67.55545 |
| G4 | 13 | 176.42266 |
| G5 | 29 | 627.63137 |
| G4A | 13 | 78.55342 |
| G4B | 19 | −57.55195 |
| G4C | 22 | 118.07179 |

[Values for Conditional Expressions]

R31A = 129.418000
R31B = −58.89280
ft = 291.54877
fw = 72.00486
f1 = 97.08614
f2 = −26.14657
f3 = 67.55545
(1) R31A/(−R31B) = 2.198
(2) ft/f3 = 4.316
(3) f1/fw = 1.348
(4) (−f2)/fw = 0.3631

Figure 10A:
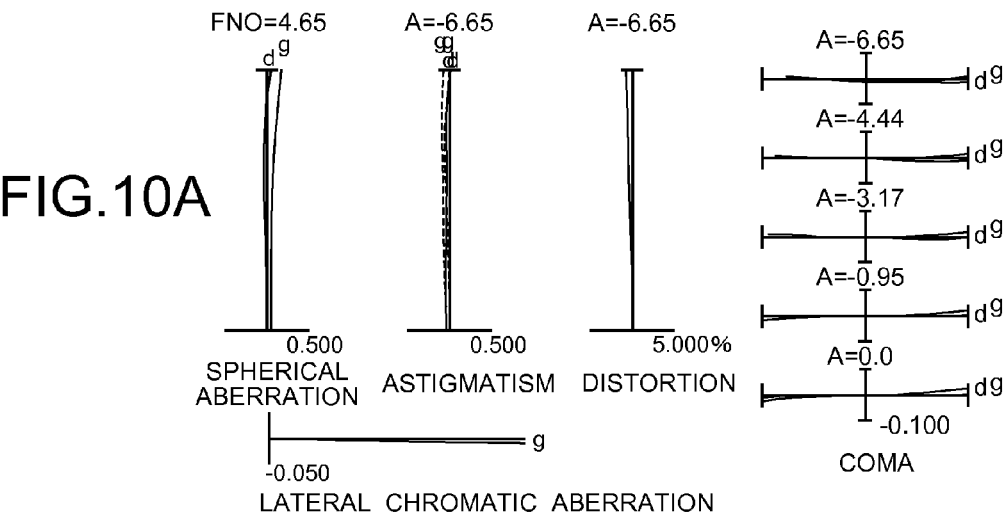
FIGS. 10A, 10B and 10C are, respectively, graphs showing various aberrations of the zooming optical system according to the fifth Example upon focusing on an infinite-distance object.
Figure 10B:
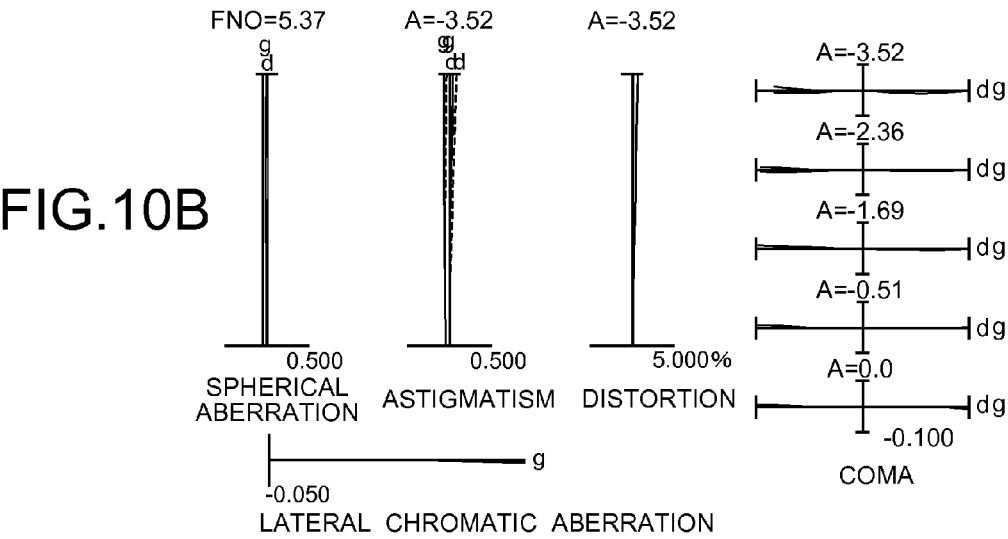
Figure 10C:
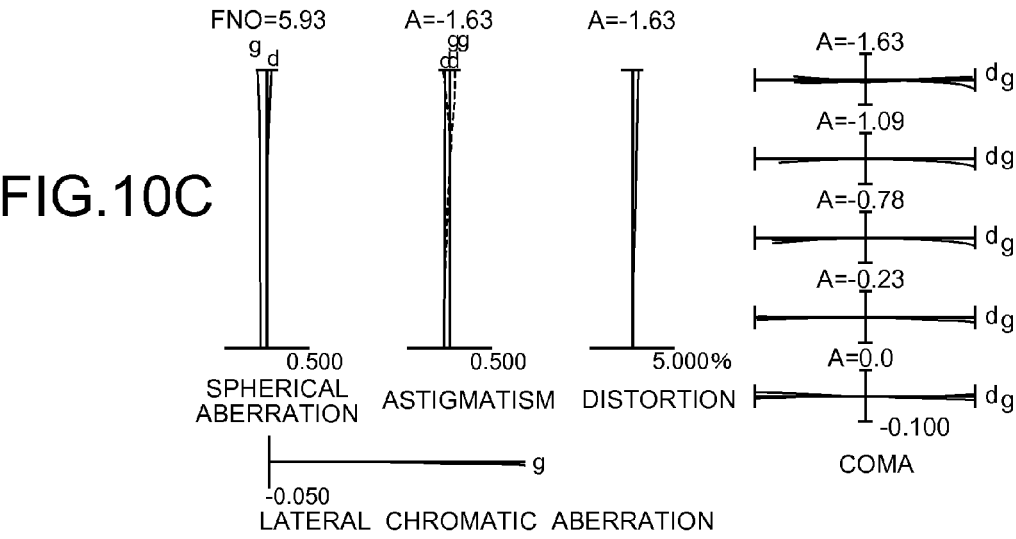

FIGS. 10A, 10B and 10C are diagrams of the various aberrations upon focusing on the infinite-distance object of the zooming optical system ZL5 according to the fifth Example; FIG. 10A shows the wide-angle end state; FIG. 10B shows the intermediate focal length state; and FIG. 10C shows the telephoto end state.

As apparent from the respective aberration diagrams, it is understood that the zooming optical system ZL5 according to the fifth Example corrects well the various aberrations from the wide-angle end state to the telephoto end state throughout, and exhibits the high optical performance.

Herein, each of the Examples demonstrates one specific example, however, the present invention is not limited to these Examples. Contents of the following description can be properly adopted within a range that does not deteriorate the optical performance.

The 4-lens-group optical system or the 5-lens-group optical system has been demonstrated by way of the Numerical Examples of the zooming optical system according to the present invention, however, the present invention is not limited to these lens group configurations but can take other lens group configurations, in which, for instance, a 6-lens-group optical system can be configured as the zooming optical system. To be specific, any inconvenience may not be caused by taking a configuration of adding a lens or a lens group on the side closest to the object in the zooming optical system according to the present invention, or a configuration of adding a lens or a lens group on the side closest to the image. Note that the lens group represents a unit including at least one lens element separated at an air gap.

Further, a focusing lens group of the zooming optical system according to the present invention is also suited to driving by a motor, e.g., an ultrasonic motor etc. for the auto focusing.

Moreover, the zooming optical system according to the present invention can be also configured so that the whole or a part of any one of the lens groups is moved as an anti-vibration lens group so as to have a component in the direction orthogonal to the optical axis, or is rotationally moved, i.e., swayed in an intra-plane direction containing the optical axis, thereby correcting the image blur caused by the camera shake etc. Particularly, it is preferable that at least apart of the fourth lens group is formed as the anti-vibration lens group.

Further, a lens surface of each of the lenses configuring the zooming optical system according to the present invention may be formed as a spherical surface or a flat surface or an aspherical surface. A case that the lens surface is the spherical surface or the flat surface facilitates lens machining and an assembly adjustment and is preferable because of being capable of preventing the optical performance from being deteriorated due to errors of the lens machining and the assembly adjustment. Furthermore, if the image plane deviates, there is preferably a small amount of deterioration of image rendering performance. If the lens surface is the aspherical surface, it may be sufficient that the lens surface is formed as any one of an aspherical surface based on the cutting work, a glass mold aspherical surface formed by molding a glass in an aspherical shape and a composite aspherical surface formed by coating a resin over the surface of the glass in the aspherical shape. Further, the lens surface may be formed as a diffraction surface, and the lens may be formed as a refractive index distribution type lens (GRIN (GRadient INdex) lens) or a plastic lens.

It is preferable in the zooming optical system according to the present invention that the aperture stop S is disposed in the vicinity of the fourth lens group, however, a lens frame may also substitute for a role of the aperture stop without providing a member as the aperture stop.

Furthermore, the lens surface of each of the lenses configuring the zooming optical system according to the present invention may be coated with an anti-reflection film having a high transmittance in a broad wave range. With this configuration, it is feasible to reduce a flare and ghost and to attain the high optical performance with the high contrast.

Next, an optical apparatus equipped with the zooming optical system ZL according to the present invention will be described by exemplifying a digital single lens reflex camera.

Figure 11:
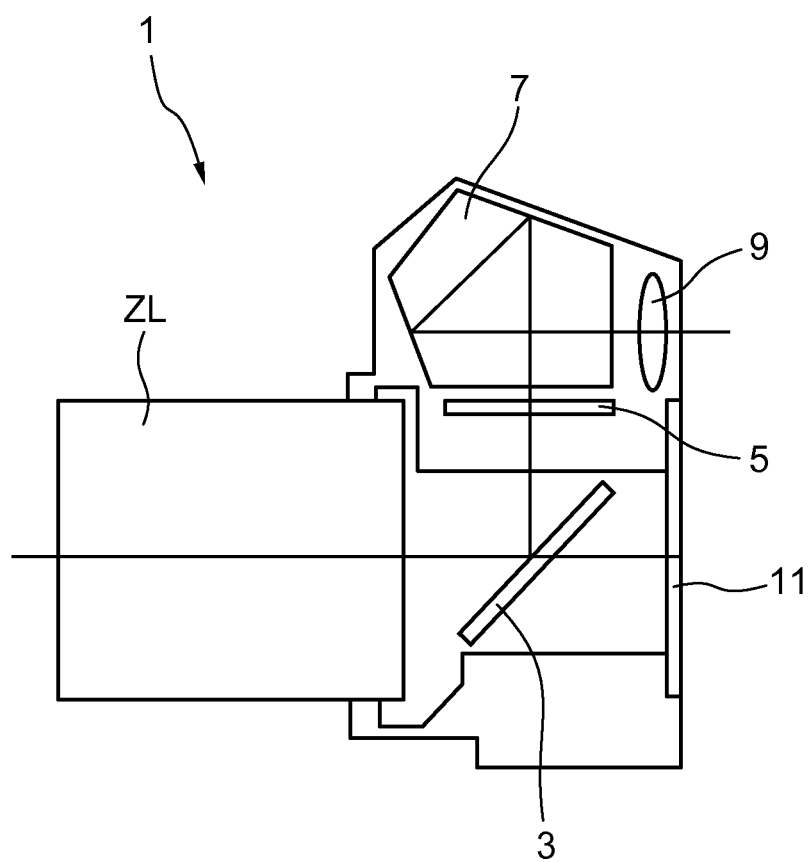
FIG. 11 is a view schematically showing a camera equipped with the zooming optical system according to the present invention.

FIG. 11 is a view showing an outline of a digital single lens reflex camera equipped with a zooming optical system according to the present invention. In a digital single lens reflex camera 1 equipped with the zooming optical system according in FIG. 11, a light flux from an unillustrated object (an object to be imaged) is collected by the zooming optical system ZL, and an image of the collected light is formed on a focusing screen 5 via a quick return mirror 3. Then, the light, with its image being formed on the focusing screen 5, is reflexed a plural number of times within a pentaprism 7 and guided to an eyepiece 9. The operation being thus performed, a photographer can observe the image of the object as an erect image via the eyepiece 9.

Further, when the photographer depresses an unillustrated release button, the quick return mirror 3 retreats off a light path, and the light traveling from the object and collected by the zooming optical system ZL forms the image on an imaging element 11. The light from the object is thereby imaged by the imaging element 11, and the captured image is recorded as the image of the object on a memory (unillustrated). Thus, the photographer can capture the image of the object through the camera 1.

With the configuration described above, the digital single lens reflex camera 1 equipped with the zooming optical system according to the present invention attains the downsizing and the speed-up of the auto focusing and further corrects excellently the various aberrations, thereby enabling the high optical performance to be realized. Note that the camera 1 may be configured to detachably hold the phototaking lens and may also be formed integrally with the phototaking lens. Furthermore, the camera may be a single lens reflex camera and may also be a camera not including the quick return mirror etc.

Next, a method for manufacturing the zooming optical system ZL according to the present invention will be described. FIG. 12 is a flowchart showing an outline of the method for manufacturing the zooming optical system ZL according to the present invention.

A method for manufacturing the zooming optical system ZL according to the present invention is a method for manufacturing a zooming optical system including, in order from an object side along an optical axis, a first lens group having positive refractive power, a second lens group having negative refractive power, a third lens group having positive refractive power and a fourth lens group having positive refractive power, the method including, as shown in FIG. 12, the following steps S1-S3:

Step S1 of constructing the first to fourth lens groups such that upon zooming from a wide-angle end state to a telephoto end state, a distance between the first lens group and the second lens group, a distance between the second lens group and the third lens group, and a distance between the third lens group and the fourth lens group may be respectively varied;

Step 2 of constructing the third lens group by a positive lens; and

Step 3 of constructing the third lens group to move in a direction of the optical axis such that focusing from an infinite-distance object to a near-distance object may be conducted.

According to the method for manufacturing the zooming optical system of the present invention, it is feasible to attain the downsizing and the speed-up of the autofocusing and to manufacture the zooming optical system exhibiting the high optical performance.

What is claimed is:

1. A zooming optical system comprising, in order from an object side along an optical axis: a first lens group having positive refractive power; a second lens group having negative refractive power; a third lens group having positive refractive power; and a fourth lens group having positive refractive power;

upon zooming from a wide-angle end state to a telephoto end state, a distance between said first lens group and said second lens group being varied, a distance between said second lens group and said third lens group being varied, and a distance between said third lens group and said fourth lens group being varied;

said third lens group comprising one positive lens;

focusing from an infinite-distance object up to a near-distance object being conducted by moving said third lens group in a direction of the optical axis; and the following conditional expression being satisfied:

$$1.00 < R31A/(-R31B) < 3.00$$

where R31A denotes a radius of curvature of an object-side surface of said positive lens of said third lens group, and R31B represents a radius of curvature of an image-side surface of said positive lens of said third lens group.

2. The zooming optical system according to claim 1, wherein said positive lens of said third lens group has a biconvex shape.

3. The zooming optical system according to claim 1, wherein a lens surface of said positive lens of said third lens group is a spherical surface.

4. The zooming optical system according to claim 1, wherein the following conditional expression is satisfied:

$$3.50 < ft/f3 < 5.00$$

where ft denotes a focal length of the zooming optical system in the telephoto end state, and f3 represents a focal length of said third lens group.

5. The zooming optical system according to claim 1, wherein the following conditional expression is satisfied:

$$1.00 < f1/fw < 2.00$$

where f1 denotes a focal length of said first lens group, and fw represents the focal length of the zooming optical system in the wide-angle end state.

6. The zooming optical system according to claim 1, wherein the following conditional expression is satisfied:

$$0.300 < (-f2)/fw < 0.500$$

where f2 denotes a focal length of said second lens group, and fw represents the focal length of the zooming optical system in the wide-angle end state.

7. The zooming optical system according to claim 1, wherein said fourth lens group includes, in order from the object side along the optical axis, a subgroup A having positive refractive power, a subgroup B having negative refractive power and a subgroup C having positive refractive power, said subgroup B being movable with a movement component in a direction substantially orthogonal to the optical axis, thereby correcting an image blur caused by a camera shake.

8. The zooming optical system according to claim 1, wherein upon zooming from the wide-angle end state to the telephoto end state, said first lens group is moved along the optical axis toward the object side with respect to an image plane.

9. An optical apparatus equipped with said zooming optical system according to claim 1.

10. A zooming optical system comprising, in order from an object side along an optical axis: a first lens group having positive refractive power; a second lens group having negative refractive power; a third lens group having positive refractive power; and a fourth lens group having positive refractive power;

upon zooming from a wide-angle end state to a telephoto end state, a distance between said first lens group and said second lens group being varied, a distance between said second lens group and said third lens group being varied, and a distance between said third lens group and said fourth lens group being varied;

said third lens group comprising one positive lens;

focusing from an infinite-distance object up to a near-distance object being conducted by moving said third lens group in a direction of the optical axis; and the following conditional expression being satisfied:

$$3.50 < ft/f3 < 5.00$$

where ft denotes a focal length of the zooming optical system in the telephoto end state, and f3 represents a focal length of said third lens group.

11. The zooming optical system according to claim 10, wherein said positive lens of said third lens group has a biconvex shape.

12. The zooming optical system according to claim 10, wherein a lens surface of said positive lens of said third lens group is a spherical surface.

13. The zooming optical system according to claim 10, wherein said fourth lens group includes, in order from the object side along the optical axis, a subgroup A having positive refractive power, a subgroup B having negative refractive power and a subgroup C having positive refractive power, said subgroup B being movable with a movement component in a direction substantially orthogonal to the optical axis, thereby correcting an image blur caused by a camera shake.

14. The zooming optical system according to claim 10, wherein upon zooming from the wide-angle end state to the telephoto end state, said first lens group is moved along the optical axis toward the object side with respect to an image plane.

15. An optical apparatus equipped with said zooming optical system according to claim 10.

16. A zooming optical system comprising, in order from an object side along an optical axis: a first lens group having positive refractive power; a second lens group having negative refractive power; a third lens group having positive refractive power; and a fourth lens group having positive refractive power;

upon zooming from a wide-angle end state to a telephoto end state, a distance between said first lens group and said second lens group being varied, a distance between said second lens group and said third lens group being varied, and a distance between said third lens group and said fourth lens group being varied;

said third lens group comprising one positive lens;

focusing from an infinite-distance object up to a near-distance object being conducted by moving said third lens group in a direction of the optical axis; and the following conditional expression being satisfied:

$$1.00 < f1/fw < 2.00$$

where f1 denotes a focal length of said first lens group, and fw represents the focal length of the zooming optical system in the wide-angle end state.

17. The zooming optical system according to claim 16, wherein said positive lens of said third lens group has a biconvex shape.

18. The zooming optical system according to claim 16, wherein a lens surface of said positive lens of said third lens group is a spherical surface.

19. The zooming optical system according to claim 16, wherein said fourth lens group includes, in order from the object side along the optical axis, a subgroup A having positive refractive power, a subgroup B having negative refractive power and a subgroup C having positive refractive power, said subgroup B being movable with a movement component in a direction substantially orthogonal to the optical axis, thereby correcting an image blur caused by a camera shake.

20. The zooming optical system according to claim 16, wherein upon zooming from the wide-angle end state to the telephoto end state, said first lens group is moved along the optical axis toward the object side with respect to an image plane.

21. An optical apparatus equipped with said zooming optical system according to claim 16.

22. A zooming optical system comprising, in order from an object side along an optical axis: a first lens group having positive refractive power; a second lens group having negative refractive power; a third lens group having positive refractive power; and a fourth lens group having positive refractive power;

upon zooming from a wide-angle end state to a telephoto end state, a distance between said first lens group and said second lens group being varied, a distance between said second lens group and said third lens group being varied, and a distance between said third lens group and said fourth lens group being varied;

said third lens group comprising one positive lens;

focusing from an infinite-distance object up to a near-distance object being conducted by moving said third lens group in a direction of the optical axis; and the following conditional expression being satisfied:

$$0.300 < (-f2)/fw < 0.500$$

where f2 denotes a focal length of said second lens group, and fw represents the focal length of the zooming optical system in the wide-angle end state.

23. The zooming optical system according to claim 22, wherein said positive lens of said third lens group has a biconvex shape.

24. The zooming optical system according to claim 22, wherein a lens surface of said positive lens of said third lens group is a spherical surface.

25. The zooming optical system according to claim 22, wherein said fourth lens group includes, in order from the object side along the optical axis, a subgroup A having positive refractive power, a subgroup B having negative refractive power and a subgroup C having positive refractive power, said subgroup B being movable with a movement component in a direction substantially orthogonal to the optical axis, thereby correcting an image blur caused by a camera shake.

26. The zooming optical system according to claim 22, wherein upon zooming from the wide-angle end state to the telephoto end state, said first lens group is moved along the optical axis toward the object side with respect to an image plane.

27. An optical apparatus equipped with said zooming optical system according to claim 22.

28. A method for manufacturing a zooming optical system comprising, in order from an object side along an optical axis: a first lens group having positive refractive power; a second lens group having negative refractive power; a third lens group having positive refractive power; and a fourth lens group having positive refractive power;

said method comprising steps of:

arranging the first to fourth lens groups such that upon zooming from a wide-angle end state to a telephoto end state, a distance between the first lens group and the second lens group, a distance between the second lens group and the third lens group, and a distance between the third lens group and the fourth lens group are respectively varied, constructing the third lens group to comprise a positive lens, arranging the third lens group to be movable in a direction of the optical axis to conduct focusing from an infinite-distance object to a near-distance object, and satisfying the following conditional expression:

$$1.00 < R31A/(-R31B) < 3.00$$

where R31A denotes a radius of curvature of an object-side surface of said positive lens of said third lens group, and R31B represents a radius of curvature of an image-side surface of said positive lens of said third lens group.

29. A method for manufacturing a zooming optical system comprising, in order from an object side along an optical axis: a first lens group having positive refractive power; a second lens group having negative refractive power; a third lens group having positive refractive power; and a fourth lens group having positive refractive power;

said method comprising steps of:

arranging the first to fourth lens groups such that upon zooming from a wide-angle end state to a telephoto end state, a distance between the first lens group and the second lens group, a distance between the second lens group and the third lens group, and a distance between the third lens group and the fourth lens group are respectively varied, constructing the third lens group to comprise a positive lens, arranging the third lens group to be movable in a direction of the optical axis to conduct focusing from an infinite-distance object to a near-distance object, and satisfying the following conditional expression:

$$3.50 < ft/f3 < 5.00$$

where ft denotes a focal length of the zooming optical system in the telephoto end state, and f3 represents a focal length of said third lens group.

30. A method for manufacturing a zooming optical system comprising, in order from an object side along an optical axis: a first lens group having positive refractive power; a second lens group having negative refractive power; a third lens group having positive refractive power; and a fourth lens group having positive refractive power;

said method comprising steps of:

arranging the first to fourth lens groups such that upon zooming from a wide-angle end state to a telephoto end state, a distance between the first lens group and the second lens group, a distance between the second lens group and the third lens group, and a distance between the third lens group and the fourth lens group are respectively varied, constructing the third lens group to comprise a positive lens, arranging the third lens group to be movable in a direction of the optical axis to conduct focusing from an infinite-distance object to a near-distance object, and satisfying the following conditional expression:

$$1.00 < f1/fw < 2.00$$

where f1 denotes a focal length of said first lens group, and fw represents the focal length of the zooming optical system in the wide-angle end state.

31. A method for manufacturing a zooming optical system comprising, in order from an object side along an optical axis: a first lens group having positive refractive power; a second lens group having negative refractive power; a third lens group having positive refractive power; and a fourth lens group having positive refractive power;

said method comprising steps of:

arranging the first to fourth lens groups such that upon zooming from a wide-angle end state to a telephoto end state, a distance between the first lens group and the second lens group, a distance between the second lens group and the third lens group, and a distance between the third lens group and the fourth lens group are respectively varied, constructing the third lens group to comprise a positive lens, arranging the third lens group to be movable in a direction of the optical axis to conduct focusing from an infinite-distance object to a near-distance object, and satisfying the following conditional expression:

$$0.300 < (-f2)/fw < 0.500$$

where f2 denotes a focal length of said second lens group, and fw represents the focal length of the zooming optical system in the wide-angle end state.

* * * * *